United States Patent [19]

Negas et al.

[11] Patent Number: 5,512,524

[45] Date of Patent: Apr. 30, 1996

[54] DIELECTRIC CERAMIC COMPOSITIONS

[75] Inventors: Taki Negas, Frederick; Glenn J. Yeager, Walkersville, both of Md.

[73] Assignee: Trans-Tech, Inc., Adamstown, Md.

[21] Appl. No.: 366,396

[22] Filed: Dec. 29, 1994

Related U.S. Application Data

[63] Continuation of Ser. No. 134,818, Oct. 12, 1993, abandoned, which is a continuation-in-part of Ser. No. 864,730, Apr. 7, 1992, Pat. No. 5,262,370.

[51] Int. Cl.$^6$ .................................................. C04B 35/46
[52] U.S. Cl. ............................................ 501/138; 501/139
[58] Field of Search ..................................... 501/138, 139

[56] References Cited

U.S. PATENT DOCUMENTS

| | | | |
|---|---|---|---|
| Re. 29,484 | 11/1977 | Utsumi et al. ...................... | 501/138 |
| 3,938,064 | 2/1976 | O'Bryan, Jr. et al. ............... | 333/73 S |
| 4,330,631 | 5/1982 | Kawashima et al. ................ | 501/139 |
| 4,337,446 | 6/1982 | O'Bryan, Jr. et al. ............... | 333/238 |
| 4,563,661 | 1/1986 | O'Bryan, Jr. et al. ............... | 333/202 |
| 5,262,370 | 11/1993 | Negas et al. ........................ | 501/138 |

FOREIGN PATENT DOCUMENTS

| | | | |
|---|---|---|---|
| 0532780 | 11/1956 | Canada .............................. | 501/138 |
| 0004358 | 2/1977 | Japan ................................ | 501/138 |
| 7069607 | 4/1982 | Japan ................................ | C04B 35/46 |
| 9020907 | 2/1984 | Japan ................................ | C04B 35/46 |
| 9094302 | 5/1984 | Japan ................................ | C04B 35/46 |

*Primary Examiner*—Deborah Jones
*Attorney, Agent, or Firm*—Nikaido, Marmelstein, Murray & Oram

[57] ABSTRACT

The present invention is directed to a ceramic composition comprising at least three of the four phases $BaTi_4O_9$, $Ba_2Ti_9$, $BaZn_2Ti_4O_{11}$ and $Ba_3Nb_4Ti_4O_{21}$ (i.e., the phases $BT_4ss$, $BZ_2T_9ss$ $BZ_2T_4$ and BNbT). The ceramic composition may further comprise the phase $Ba_3Ta_4Ti_4O_{21}$ (BTaT). The ceramic compositions have an excellent combination of electrical characteristics including Q value at the frequencies of interest for dielectric resonators, the dielectric constant and the $T_f$ value and are well adapted for use as electrical components in equipment operating at microwave frequencies such cellular communications equipment.

9 Claims, 10 Drawing Sheets

DIELECTRIC CERAMIC COMPOSITIONS

This application is a continuation of application Ser. No. 08/134,818 filed Oct. 12, 1993, now abandoned, which is a continuation-in-part of application Ser. No. 07/864,730, filed Apr. 7, 1992, now U.S. Pat. No. 5,262,370.

The present invention relates generally to ceramic compositions having excellent electrical properties and, more particularly, to ceramic compositions especially adapted for use as electrical components for microwave applications such as in receivers for broadcasting systems such as satellite broadcasting, in communications equipment such as dielectric resonators for cellular telephone equipment, and in detection devised such as frequency sensors.

Ceramics based on $BaTi_4O_9$ and $Ba_2Ti_9O_{20}$ have been largely ignored over the past decade by manufacturers of high Q, high dielectric constant, temperature compensated materials for commerical wireless communications at elevated frequencies. When processed correctly, these ceramics yield properties that rival if not exceed those of $ZrTiO_4$-based products currently used. Incorporating ZnO/ $Me_2O_5$ (Me=Ta, Nb) into these improved materials produces new composites that exhibit exceptional properties for cellular telephone base station filter applications, ~1 GHz. Processing/properties are related to the complex chemistry through a preliminary model of the system $BaTi_4O_9$—$TiO_2$—ZnO—$Me_2O_5$.

Commercial wireless communications applications emerged in the late 1970s, evolved in the 1980s, and are poised to explode through the 1990s. Numerous systems are rapidly filling the 400 MHz-20 GHz band. Cellular telephone (400 MHz-1 GHz), Television Receive Only (TVRO, 2–5 GHz), Direct Broadcasting (DBS, 11–13 GHz), and specialty satellite communications are now deployed worldwide. Wireless cable, high definition and interactive TV, collision avoidance, global positioning, cellular satellite, and personal communications (PCS) of many types loom in the near future for consumers.

Among several factors, industrial growth has been spurred by the development of special ceramics and their commercialization as high volume, low cost products. These materials are easily integrated into RF/microwave circuits using glues, epoxies, screws, or solder. They function as frequency filters, capacitors, inductors, and signal distributing elements. Electrical requirements are low loss (high Q), high dielectric constant ($É$), and very low temperature coefficient of resonant frequency ($T_f$).

High Q not only minimizes circuit insertion losses but, for some filter applications, also allows more channels within a given frequency allocation. In addition, electrical noise is suppressed in oscillator devices. The Q requirement precludes use of familiar high $É$ capacitor, piezoelectric, and ferroelectric ceramics that are orders of magnitude more lossy. High $É$ shrinks overall circuit/device size proportional to $1/(É)^{1/2}$. For example, a circuit is compressed by a factor of six when a high Q ceramic, $É=36$, is substituted for a high Q air cavity, $É=1$. Low $T_f$ compensates for frequency drift due to circuit heating and/or variations in ambient temperature. Although several manufacturers may produce similar components for the same application, there are subtle differences in circuit design, construction, and packaging. Since frequency drift of a device is a consequence of the overall thermal expansion of its unique combination of construction materials, each design requires a slightly different $T_f$ for temperature compensation. Typicaly, ceramics with a specific $T_f$ in the range 16 to –6 ppm/° C. are selected.

In ceramic production, $T_f$ and $É$ specifications must be held to demanding tolerances of ±0.5 ppm/° C. and ±1%, respectively.

O'Bryan and coworkers (H. M. O'Bryan, J. Thomson, and J. K. Plourde, "A New BaO—$TiO_2$ Compound with Temperature-Stable High Permittivity and Low Microwave Loss" J. Am. Ceram. Soc., 57 [10] 450–53 (1974); J. K. Plourde, D. F. Linn, H. M. O'Bryan, and J. Thomson, "$Ba_2Ti_9O_{20}$ as a Microwave Dielectric Resonator", J. Am. Ceram. Soc., 58 [9–10]. 418–20 (1975); and H. M. O'Bryan, J. K. Pluorde, and J. Thomson, U.S. Pat. No. 4,563,661 (1986)) pioneered $Ba_2Ti_9O_{20}(B_2T_9)$-based ceramics into the mid-1980s. These were developed as filters for the base stations of the infant cellular industry and for conventional telephone microwave relays. Meanwhile, worldwide industrial attention shifted to $(Zr,Sn)(Ti,Sn)O_4$ solid solutions demonstrated (G. Wolfram and E. Göbel, "Existence Range, Structural, and Dielectric Properties of $Zr_xTi_ySn_zO_4$ Ceramics (x+y+z=2)" Mater. Res. Bull., 16 [11] 1455–63 (1981)) to have high Q (>10K, 4.5 GHz), high $É$ (34–40), and a low $T_f$ that is easily adjusted by varying the chemistry. These gained rapid acceptance desiite some very difficult processing problems beyond the scope of this discussion. The simpler, less expensive, and very promising barium titanates, particularly $BaTi_4O_9(BT_4)$, were left largely ignored. Judging from periodic review papers, it appears that they lost development fervor because their Q was perceived to be "too low" and/or uncontrollable and, secondarily, because $T_f$ could not be adjusted over a broad range. Typical literature Q values range from 5–10K (4.5 GHz) while 2–5 and 14–20 ppm/° C. are $T_f$ values reported for $B_2T_9$ and $BT_4$, respectively.

While the ceramic compositions of the subject invention will be discussed primarily hereinafter with reference to their use in providing dielectric resonator filters for microwave communications equipment such as cellular telephone equipment, it is to be understood that the uses and applications of the ceramic materials of the subject invention are not thereby so limited. For example, the ceramic materials of the invention may be useful in many other types of electrical devices such as in microwave stripline circuits, oscillators, phase shifters, ceramic type capacitors and the like as well as in other non-electrical applications where ceramic type materials are used such as, for example, in applications requiring high resistance to heat and the like.

In communications equipment such as microwave cellular telephone receiving and transmitting stations, conventional circuits employ various cavity type resonators and waveguides as filters and transmission lines. In one particular application in microwave communication equipment, it is presently common practice to utilize a number of dielectric ceramic resonators to filter microwave signals for the desired transmit and receive frequency or frequencies. Typically, these dielectric resonators comprise a circular-shaped block commonly termed a puck composed entirely of a particular ceramic composite material having specific electrical characteristics particularly adapted for this application. Often, a plug or cylinder of the same material is used in combination with the puck to help tune the frequency of interest.

One of the generally accepted measures of the ceramic composition comprising the material of the dielectric resonator to accurately and precisely filter to the desired frequency to the exclusion of other frequencies is the Q value which is inversely proportional to the dielectric loss for the composition. Thus Q value may be define as equal to 1/tan $\delta$ and can be related to the bandwidth of the frequency spike filtered by the resonator. For those dielectric resonators used in microwave applications, an unloaded Q value of least 25,000 at about 1 GHz is the generally accepted minimum design value for acceptable performance and of course higher values of Q are even more desirable.

In addition to the above-mentioned Q value, the ceramic composition used in such dielectric resonators should have a low variation in the filtering frequency as the temperature of the ceramic composition varies in the range of normal ambient temperatures, generally between −30° to 70° C. As is well recognized, the frequency characteristics of ceramic materials are particularly sensitive to slight variation in the dielectric constant, particularly at the frequencies in the microwave region. In other words, the ceramic composition should filter all but the assigned frequency over the largest temperature range as possible and the frequency allowed to pass through the resonator should vary as little as possible over this same temperature range. The generally accepted measure for this characteristic of the temperature variation of the ceramic material is generally measured by a temperature coefficient which represents the change in the frequency in parts per million per degree centigrade and is commonly known as $T_f$. Acceptable values for $T_f$ are normally about −6 ppm/° C. to about +6 ppm/° C. for most commercially acceptable ceramic compositions. Specific $T_f$ values or requirements in the above range depend on circuit design and device construction materials, e.g. metals.

The third generally accepted quality measure for a ceramic composition in terms of its suitability for the above applications is the dielectric constant (É) of the composition. Generally, the composition should have a dielectric constant which is as high as possible, generally a value of at least 30, preferably about 35 or more. Without a relatively high dielectric constant, the device incorporating the ceramic composition becomes unacceptably large in size and thus equipment incorporating such devices tend to become expensive, bulky and unacceptable in the commercial marketplace. For example, with dielectric ceramic resonators, any increase in the dielectric constant for the ceramic material enable the height as well as the diameter of the device to be reduced thereby making it possible to further miniaturize the device and realize savings in space and material costs.

As with most properties of materials, there is generally a compromise among the various properties which are achieved by a particular composition relative to other compositions. Thus, for example, a composition may have an exceptionally high Q value but a mediocre or even unacceptable $T_f$ and É values. Modification of the composition in some fashion may, for example, increase the dielectric constant É but at the expense of the Q value. Consequently, almost any modification of acceptable compositions tends to become a trade-off between the various properties of interest for that particular application.

Generally speaking, there are many known ceramic compositions which have an acceptable dielectric constant and sufficiently high Q value for applications such as microwave applications but most, if not all, have a relatively large temperature variation of the dielectric constant. Thus the temperature stability is low and the compositions tend to have relatively large changes in frequency with temperature variation. To operate satisfactorily, such compositions may require external temperature stabilization which further increases costs.

Commercial dielectric ceramic compositions of particular interest for the above microwave applications generally fall within three general classes, ceramics of the compositions (a) (Zr,Sn) (Ti,Sn)$O_4$, (b) barium titanates such as $Ba_2Ti_9O_{20}$ and BaLnTi oxides where Ln is Nd or Sm, and (c) $Ba_3Ta_2MeO_9$ where Me is Zn or Mg. For example, dielectric ceramic materials of the BaLnTi-oxides where Ln is Sm are disclosed in U.S. Pat. No. 4,330,631 to Kawashima et al. In addition, dielectric ceramic materials comprising $Ba_2Ti_9O_{20}$ are disclosed in U.S. Pat. No. 3,938,064 to O'Bryan et al and a $Ba_3Ta_2ZnO_9$ type material is disclosed in Japanese Patent Application No. 53–35454. While these compositions are acceptable for many purposes including dielectric resonators for microwave communications systems, the overall combination of required electrical and physical properties as set forth above is not at an optimum and therefore those of skill in this art are constantly searching for materials or compositions having even a better overall combination of properties for these particular applications.

Recently, a dielectric resonator material containing reacted oxides of Ba, Ta, Zn and Ti has been made commercially available by NGK Insulators, Ltd. of Japan. While the precise composition of this material is not presently known, it is believed that the material contains about 3–4 mol percent $Ta_2O_5$, about 36 mol percent ZnO and the balance BaO/$TiO_2$ expressed as about 60 mol percent $BaTi_4O_9$ which, after reaction, is a crystalline mixture of $BaTi_4O_9$ and $BaTi_9O_{20}$. This material appears to exhibit a high Q value generally about 30,000 and quite acceptable values for $T_f$ and for the dielectric constant É. One real disadvantage for this ceramic material is the relatively high material costs associated with making the material, particularly for the tantalum component which is currently in the vicinity of about $80–100 per pound for tantalum oxide. While the proportion of tantalum in the material is rather small, the relatively high cost for the tantalum contributes significantly to the overall cost of a dielectric resonator incorporating this raw material.

SUMMARY OF THE INVENTION

The present invention is directed to a ceramic composition comprising at least three of the four phases $BaTi_4O_9$, $Ba_2Ti_9O_{20}$, $BaZn_2Ti_4O_{11}$ and $Ba_3Nb_4Ti_4O_{21}$ (i.e., the phases $BT_4ss$, $B_2T_9ss$, $BZ_2T_4$ and BNbT). The ceramic composition may further comprise the phase $Ba_3Ta_4Ti_4O_{21}$ (BTaT). In addition, the ceramic composition may further comprise Mn in an amount in the range of from 0.01 to 0.1, preferably 0.02 to 0.1, weight percent, based on the total weight of the composition. The ratio of the amount of Nb to the amount of Ta+Nb is preferably from about 0.001 to 1.0.

In accordance with a preferred aspect of the present invention, the composition includes $Ba_3Nb_4Ti_4O_{21}$ and $Ba_3Ta_4Ti_4O_{21}$ in respective amounts such that the ratio of amounts is 75 parts $Ba_3Nb_4Ti_4O_{21}$ to 25 parts $Ba_3Ta_4Ti_4O_{21}$.

The present invention further comprehends
a ceramic composition comprising oxides of the elements Ba, Ti, Zn and Nb, preferably a composition comprising from about 90 to 50 mole percent oxides of barium and titanium, about 1 to 50 mole percent oxides of zinc and about 0.1 to 10 mole percent oxides of niobium based on the total moles of Ba, Ti, Zn and Nb, the mole ratio of titanium to barium being from 3.8 to 4.5.

The subject invention further comprehends a ceramic composition comprising oxides of the elements Ba, Ti, Zn, and Nb, the mole ratios of the elements relative to Ba being:

$3.8 \leq Ti \leq 4.5$
$0.1 \leq Zn \leq 1.0$
$0.05 \leq Nb \leq 0.3$ and the composition contains at least one crystal structure of $BaTi_4O_9$ and $BaTi_9O_{20}$. Preferably, the mole ratio of Ti to Ba is from 4 to 4.3 and the mole ratio of Zn is 0.4 to 0.8.

Further features, objects and advantages of the present invention will become more fully apparent from a detailed consideration of the following description of the preferred embodiments of the invention.

BRIEF DESCRIPTION OF THE DRAWING FIGURES

Figure 3:
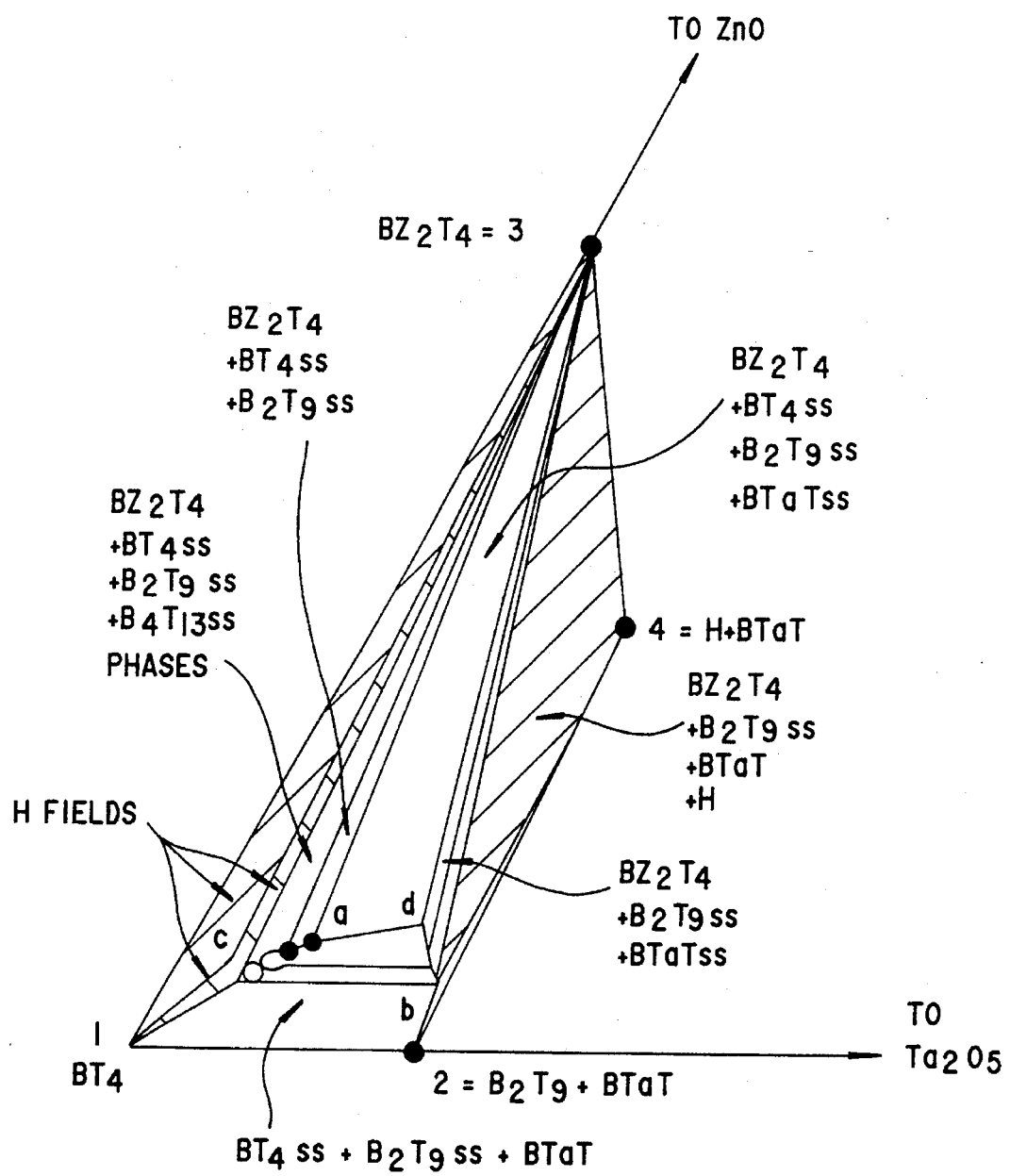

FIG. 3 is a schematic model to 1300° C. proposed for the quaternary as depicted by the section $BT_4$—$ZnO$—$Ta_2O_5$. Special trajectories are, $(BT_4+Hss)=1$ to c; $(B_2T_9ss+BTaT)=2$ to b; $(B_2T_9ss+BTaTss)=b$ to d; $(BT_4ss+B_2T_9ss)=1$ to a, where open points represent simplified intervening reactions involving $B_2T_9ss/BT_4ss$ and polytitanates, "$B_4T_{13}ss$". General n>0 sections also contain 1 to 1' ($BT_4$+ H) and 3 to 5 ($BZ_2T_4+B_2T_9ss$) tie line interceptions.

Figure 4:
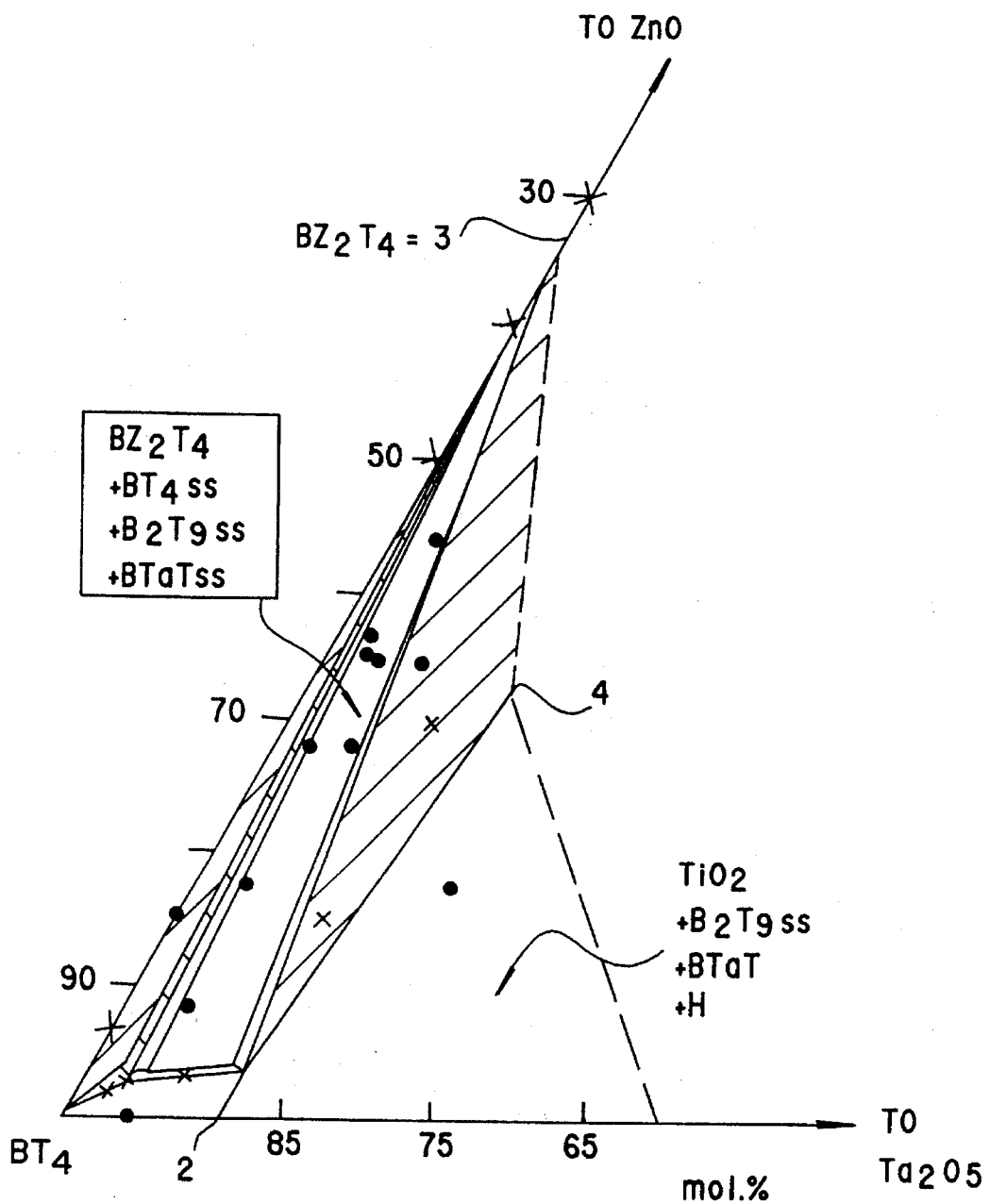

FIG. 4 depicts the quaternary at n=0 to 1300° C. Refer to FIG. 3 for phase details. Solid points=ceramic made (10 or 100 kg); crosses=powder (10 g). At n=0.1, the system is similar.

Figure 5:
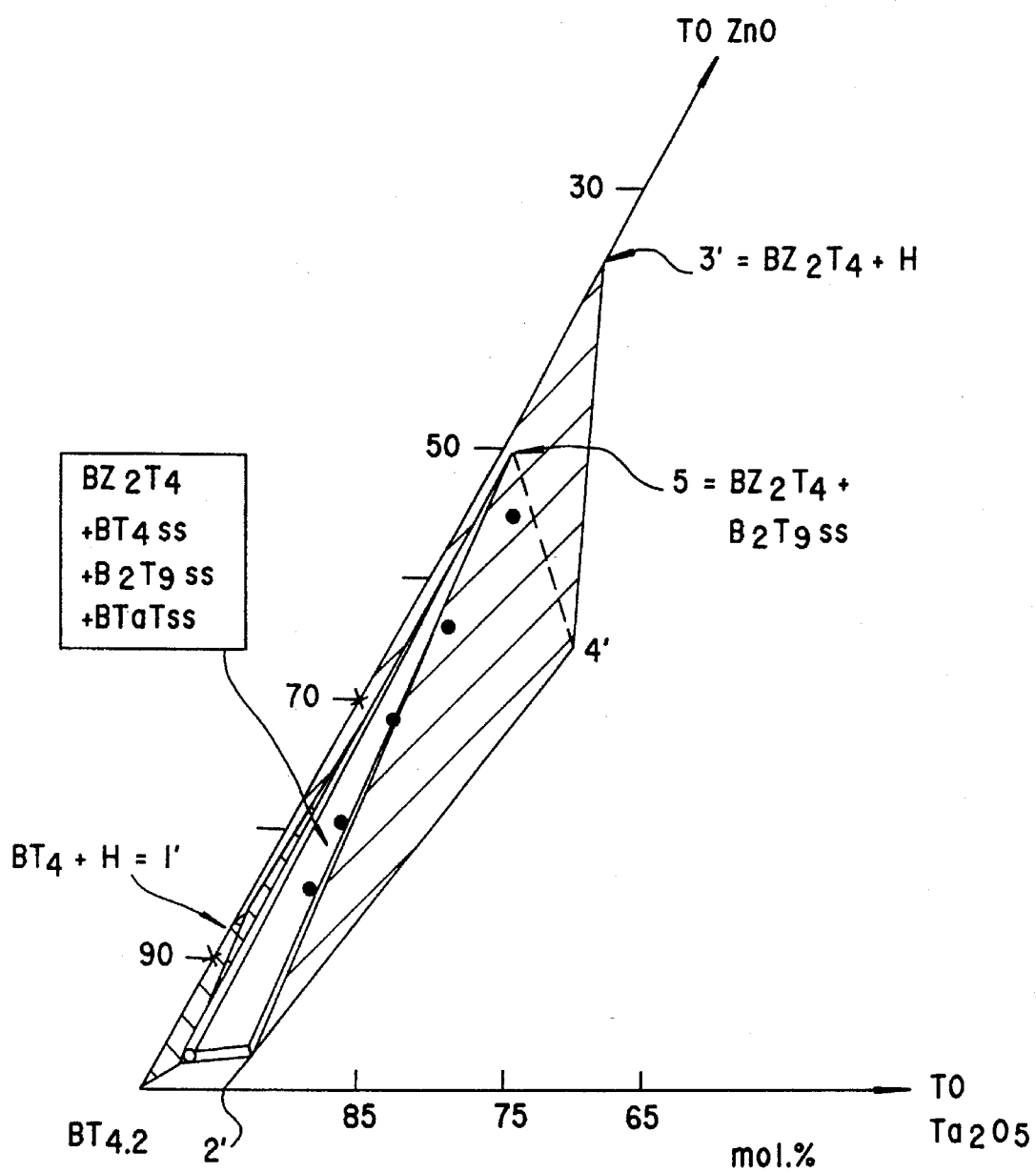

FIG. 5 depicts the quaternary at n=0.2 to 1300° C. Refer to FIGS. 3 and 4 for details.

Figure 6:
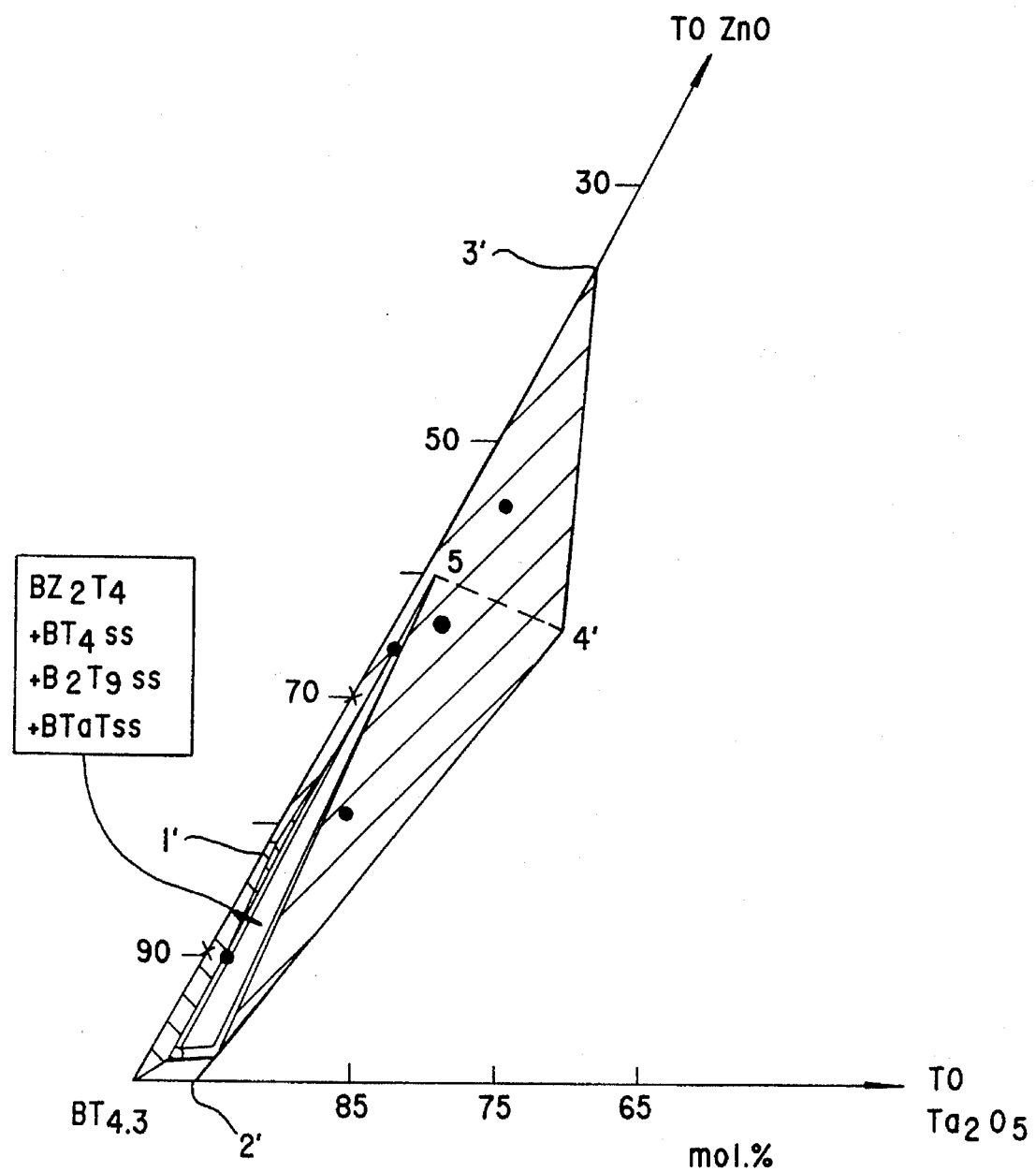

FIG. 6 depicts the quaternary at n=0.3 to 1300° C. Refer to FIGS. 3 and 4 for details.

Figure 7:
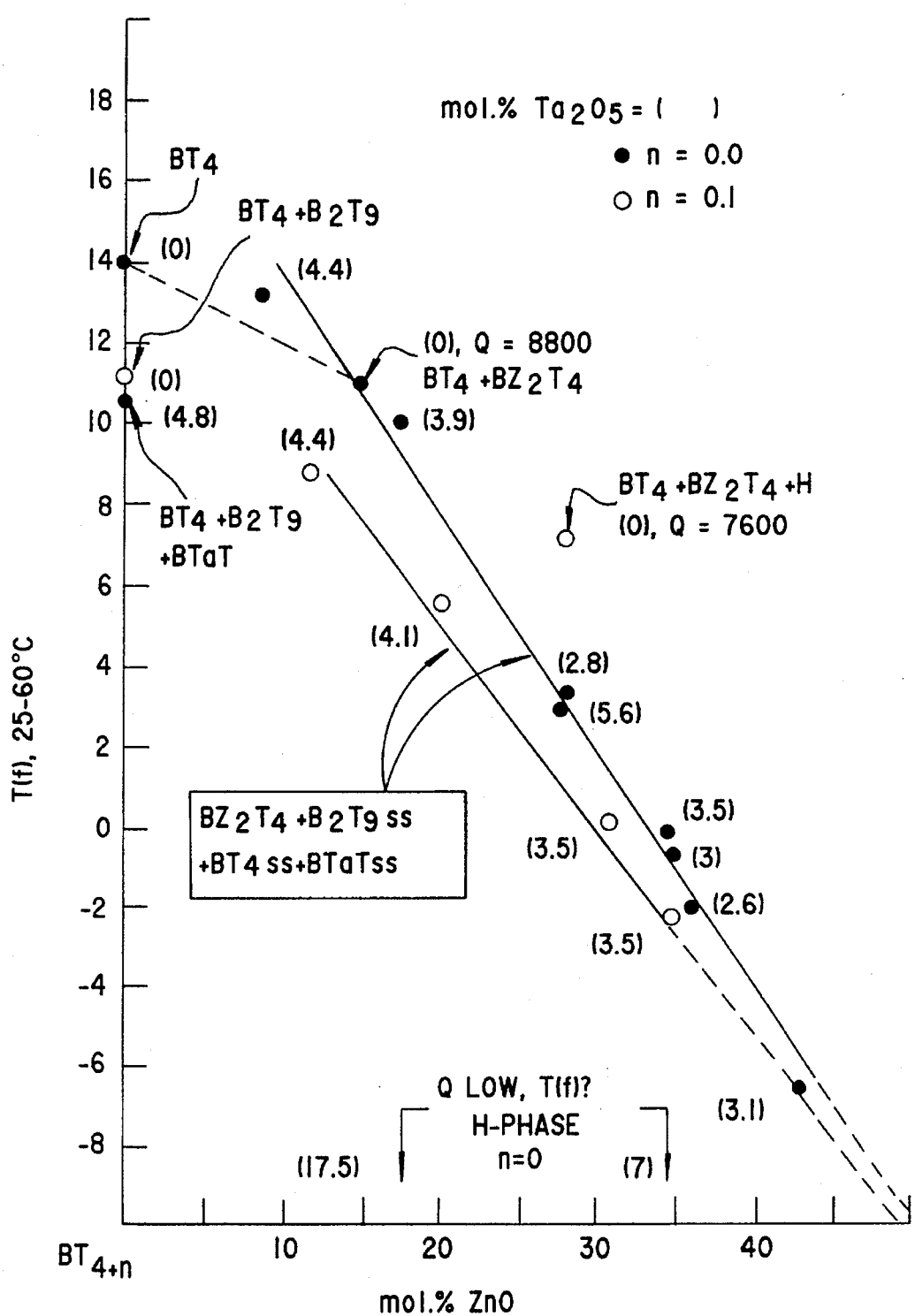

FIG. 7 depicts $T_f$ versus ZnO (and $Ta_2O_5$) for n=0, 0.1 sections. Phase assemblages without hollandite (H) have Q>10K (4.5 GHz).

Figure 8:
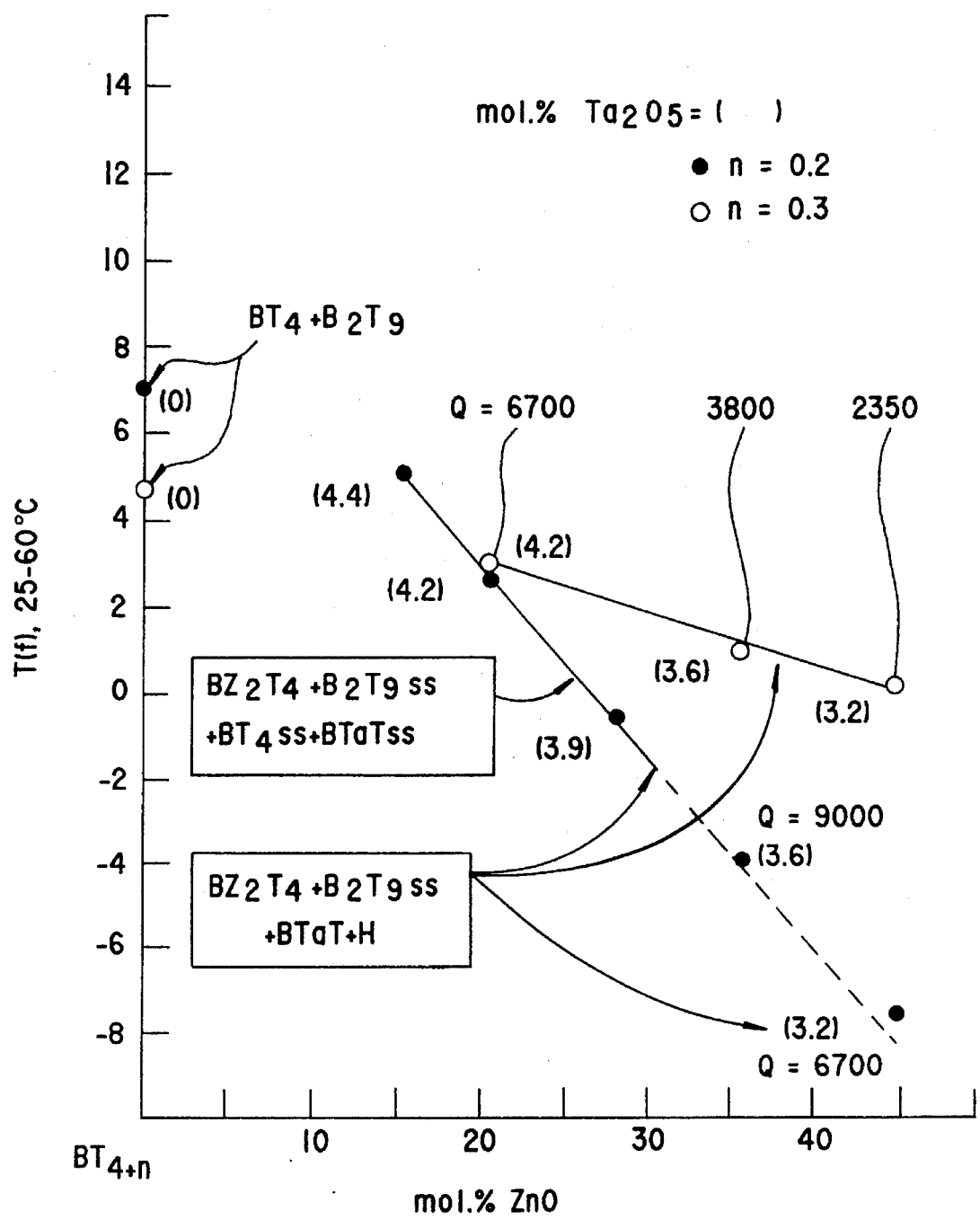

FIG. 8 depicts $T_f$ versus ZnO (and $Ta_2O_5$) for n=0.2, 0.3 sections. Phase assemblages without hollandite (H) have Q>10K (4.5 GHz).

Figure 9:
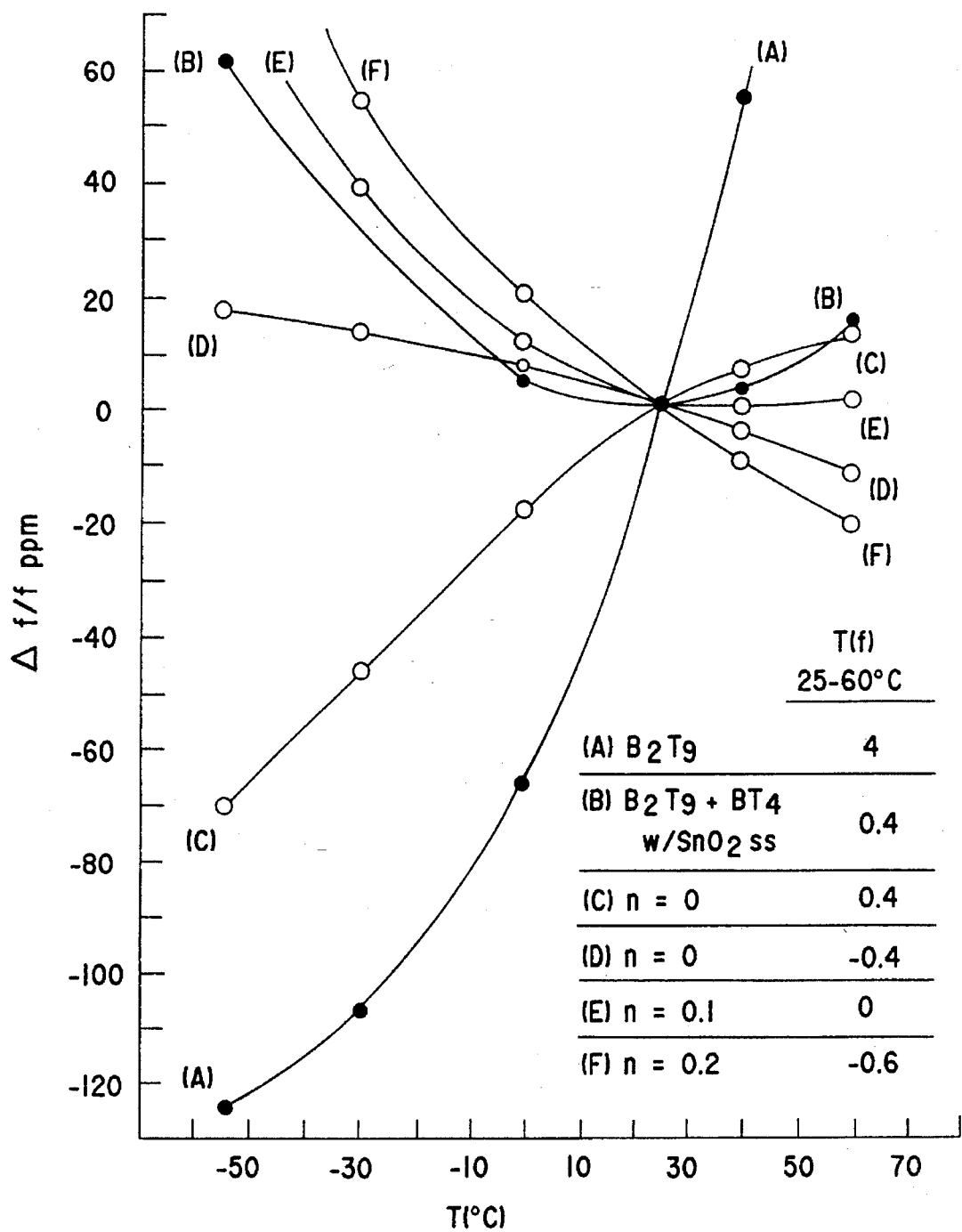

FIG. 9 depicts frequency (f) change (normalized to f at 25° C.) versus temperature for barium titanates with $T_f \approx 0$. Note curvature due to $B_2T_9$.

Figure 10:
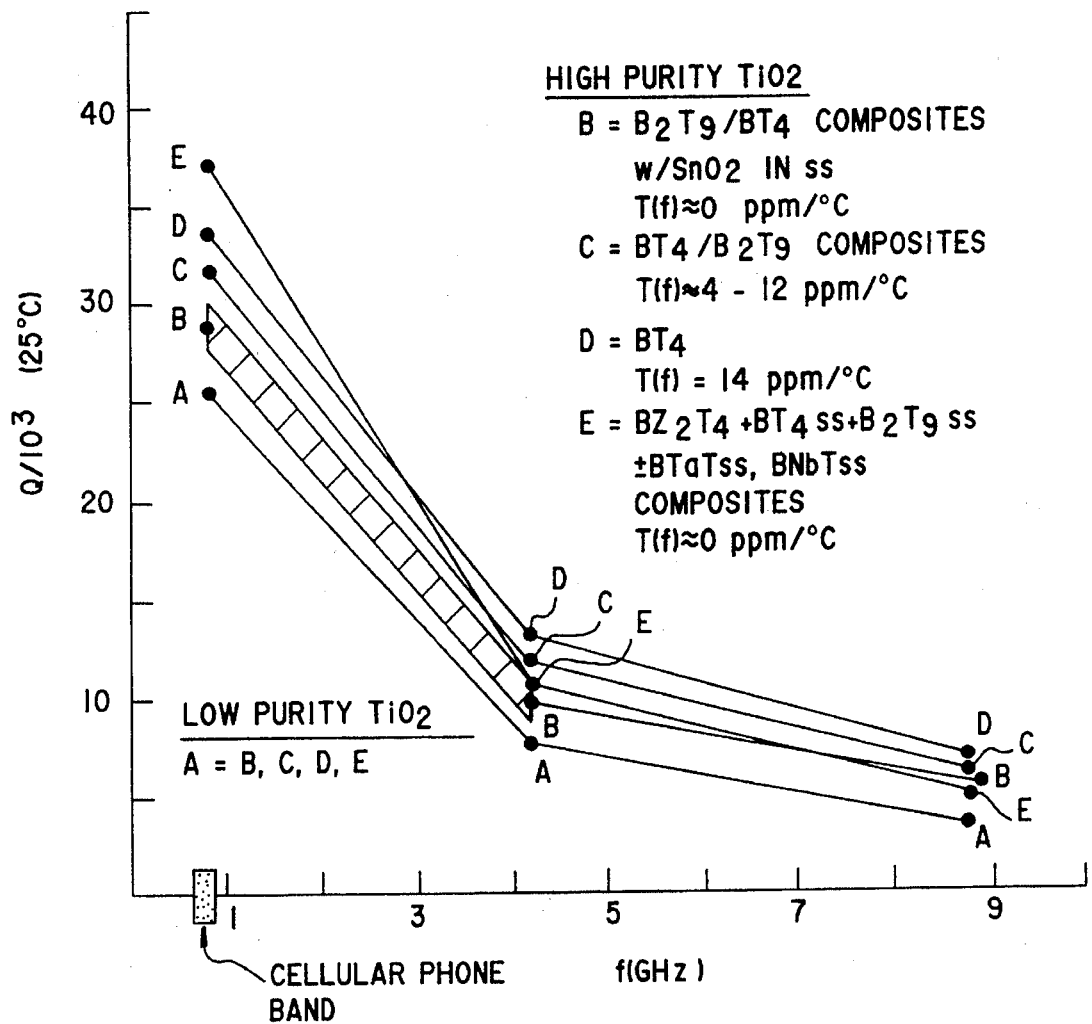

FIG. 10 depicts Q versus frequency shown as linear segments for barium titanates. Note influence of the $TiO_2$ raw material.

DETAILED DESCRIPTION OF THE INVENTION

Figure 1:
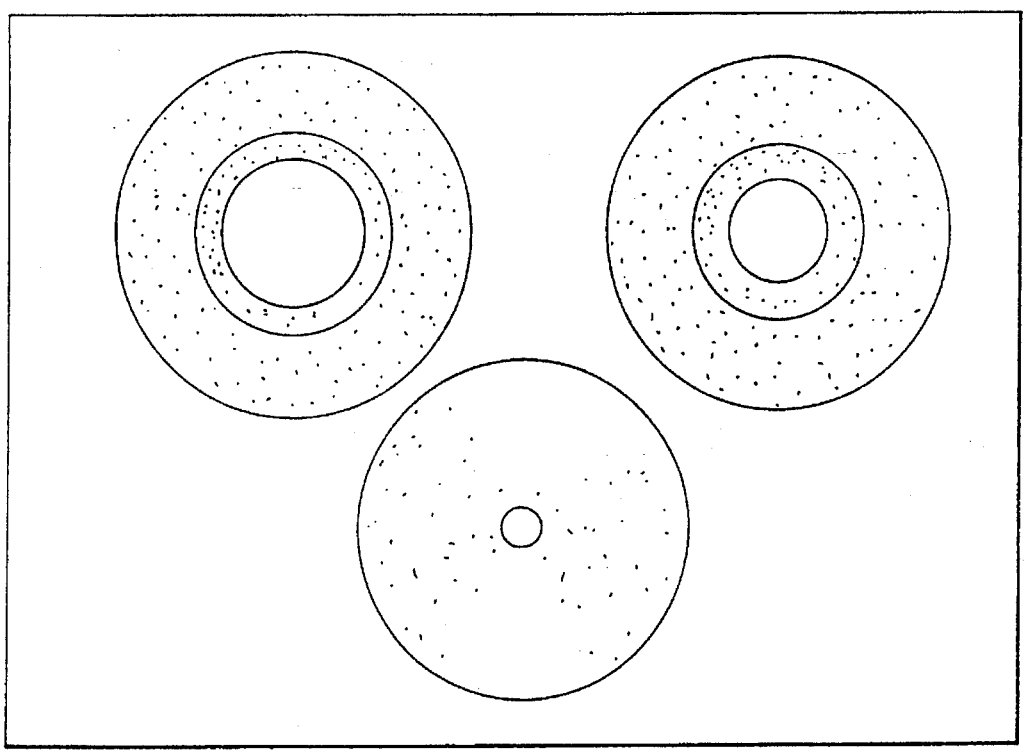
FIG. 1 depicts typical configurations of ceramic filters for cellular telphone base stations. Filter diameters are ~7 cm.

This invention addresses critical processing/property features that reconcile literature data and permit production of $B_2T_9/BT_4$ variants for applications throughout the frequency spectrum. With this necessary background, attention is focused on the newest generation of barium tianates specifically developed for cellular base station filters. Each station, roughly one every five miles, uses from 6 to 40 ceramic parts in transmit/receive circuitry. FIG. 1 illustrates typical ceramic configurations. Each reflects a unique combination of design features held proprietary by device manufacturers. É from 34–38 and $T_f$ in the 2 to –4 ppm/° C. range are required. The Q specification, however, has increased systematically from about 16K to 25K (~1 GHz) as circuits have become more sophisticated and demanding. Today, Q>30K is not an uncommon requirement.

Recently, a foreign company ushered into worldwide markets a composite based on $BT_4/B_2T_9$ with $ZnO/Ta_2O_5$ additions. It is not described in the literature to date nor is there any evidence from prior work to suggest, even remotely, that an outstanding product can be derived from the chemical system selected. This invention allows gross features of the system particularly relevant to electrical properties. The discussion centers on Ta-containing materials, but $Nb_2O_5$ yields substantially similar results.

A. $BT_4/B_2T_9$ Ceramics; Composites and Solid Solutions

Table I summarizes those aspects of processing that strongly influence the electrical/mechanical properties of $BT_4/B_2T_9$ variants. Some additional details and references are available in a recent report (T. Negas, G. Yeager, S. Bell, and R. Amren, "Chemistry and Properties of Temperature Compensated Microwave Dielectrics", NIST Special Publication 804, 21–34 (1991)). Older ceramics are distinguished from present generation products only by a lower and variable Q, 5–8K(4.5 GHz), which translates to 16–22K at cellular frequencies. At 4.5 GHz, Q exceeds 13K and 12K for $BT_4$ and $B_2T_9$, respectively, simply by using high purity (HP) $BaTiO_3$ and $TiO_2$ raw materials. Such values rival if not exceed the best reported for $ZrTiO_4$-based ceramics.

High Q, 30–35K (1 GHz), is obtained from $BT_4/B_2T_9$ composites that encompass the 14 to 4 ppm/° C. range in $T_f$. Cellular filters, however, require 2 to –4 ppm/° C. Until recently, this range was accessible only by substituting $SnO_2$ for $TiO_2$ in $B_2T_9$ or in $BT_4/B_2T_9$ composites (T. Negas, G. Yeager, S. Bell, and R. Amren, "Chemistry and Properties of Temperature Compensated Microwave Dielectrics", NIST Special Publication 804, 21–34 (1991)). For unclear reasons, this substitution reduces Q to 9–11K (4.5 GHz) and 25–30K (1 GHz). In fact, the effect is opposite that observed for $(Zr,Sn)(Ti,Sn)O_4$ disordered solid solutions.

Table I concludes with a subtle, reversible phenomenon associated with all $B_2T_9$ variants. Q anomalously decreases by 10–25%, independent of frequency (f) and purity, from near 25° to –60° C. This is mirrored by $T_f$ versus temperature data (see below). If this signals a continuous, diffusionless transition from $P\overline{1}$ to P1, loss of inversion symmetry may produce a weak ferroelectric effect sufficient to reduce Q and increase É. In a HRTEM study (P. K. Davies and R. S. Roth, "Defect Intergrowths in Barium Polytitanates" J Solid State Chem., 71 490–502 (1987)), a P1 polytype was observed intergrown with the parent $P\overline{1}$ phase. This feature should be further researched since the Q of samples, normally reported only for room temperature (RT), may be influenced by a fixed population density of P1 imposed by prior processing, impurity solutes, and bulk solid solution species ($SnO_2$, $ZrO_2$, Sr, etc.).

B. New $BT_4/B_2T_9$ Composites with $ZnO/Ta_2O_5$

1. General Features $BT_4/B_2T_9$ composites containing substantial amounts of $ZnO/Ta_2O_5$ were introduced recently. Variants with $T_f$>4 ppm/° C. have properties equivalent to $BT_4/B_2T_9$ composites. Members with 4 to –4 ppm/° C., however, outperform all ceramics currently used as cellular filters. Typically, Q is higher by 20–25% at 1 GHz and $T_f$ is very linear (–60° to 60° C.) for $\acute{E}=34$–37. Processing is simplified since densification occurs in the broad range 1240°–1300° C. without the need for oxygen to avoid reduction/coring. Anomalous grain growth is not a problem., HP $TiO_2$ and $BaTiO_3$, however, must be used to avoid low Q; manganese oxide also is a minor yet crucial ingredient. Vaporization of ZnO is not a practical problem since it is limited to surfaces of large filters which are routinely "cleaned-up" by machining operations to meet dimensional/frequency tolerances. $Ta_2O_5$ represents an economic drawback since its cost is $85–115/lb. However, $Nb_2O_5$ at $12–20/lb. can be substituted once the basics of the complex chemistry are understood.

The chemical system is complicated by many factors. At minimum, it is a quaternary containing many compounds and subtle solid solutions with homogeneity limits that depend on temperature. In turn, the latter control the distribution of tie lines for phase assemblages. XRD data often are difficult to interpret unequivocally due to multiple phases and superpositions of x-ray lines. Finally, donor/acceptor defect equilibria appear to be important.

2. System BT—$TiO_2$—ZnO—$Ta_2O_5$; Preliminary Model

XRD analysis of commercial ceramics reveals three dominant phases, $BT_4$, $B_2T_9$, and a compound identified as $Ba_3Ti_{12}Zn_7O_{34}$ (Yu. I. Gornikov., Z. Ya. Makarova, A. G. Belous, L. G. Gavrilova, V. M. Paskov, and V. P. Chalyi, "The Effect of Zinc Oxide Additions on the Phase Composition and Dielectric Properties of Barium Tetratitanate", Sov. Prog. Chem., 50[12] 1243–45 (1984)). It was claimed that the latter, having opposite sign, "improved" the temperature coefficient of $BT_4$ and that $BT_4$ accepts nearly 18 mol. % ZnO into solid solution. Recently, $BaTi_4Zn_2O_{11}(BZ_2T_4)$ was derived from a structure determination (personal communication with R. S. Roth in 1991) which shows that Zn occupies tetrahedral and octahedral positions. Our data are consistent with this general formulation but show no extensive solid solution of ZnO in $BT_4/B_2T_9$.

The system $BaTiO_3$—$TiO_2$—$Nb_2O_5$ (J. M. Millet, R. S. Roth, L. D. Ettlinger, and H. S. Parker, "Phase Equilibria and Crystal Chemistry in the Ternary System BaO—$TiO_2$—$Nb_2O_5$, I.," J. Solid State Chem., 67 259–70 (1987; and R. S. Roth, L. D. Ettlinger, and H. S. Parker, "Phase Equilibria and Crystal Chemistry in the Ternary System BaO—$TiO_2$—$Nb_2O_5$, II.", J Solid State Chem.,68 330–39 (1987) is especially applicable to this work either directly or, for the case of $Ta_2O_5$, by analogy. Important features include $Ba_3Ti_4Nb_4O_{21}$(3:4:2 or BNbT/BTaT); its solid solution, $Ba_3Ti_{4+5x}Nb_{4-4x}O_{21}(x\leq0.3$, BNbTss/BTaTss); and at least four ternary compounds containing <5 mol. % $Nb_2O_5$. The latter group has structures derived from $Ba_6Ti_{17}O_{40}$ and $Ba_4Ti_{13}O_{30}$; hence, members (polytitanates) are difficult to distinguish among themselves and their binary relatives when using XRD powder data from multiphase assemblages. Solid solution of $Nb_2O_5$ in $BT_4/B_2T_9$ is not reported for samples equilibrated with as little as 0.37 mol.% of this component.

Over 50 compositions were prepared to evaluate the system by XRD. These were reacted in Pt-foil, within the 1100°–1300° C. range, then pulled out of the kiln. Multiple heatings were conducted up and down temperature to demonstrate reversibility of reactions. Ceramics were fabricated from at least 30 of the preparations for XRD and electrical measurements.

Initially, the system $BT_4TiO_2$—ZnO was surveyed. It is dominated by a hollandite solid solution, $BaO.ZnO.xTiO_2$, 5<x<6, similiar, for example, to Mg analogues (R. S. Roth, Annual Report National Measurement Laboratory, Office of Measurements for Nuclear Technology, NBSIR 81–2441, 42–48 (1981)). Since structural/compositional details are not crucial, H=$BZT_6$ss or Hss notation is adopted. H establishes tie lines to $BT_4$, $B_2T_9$, and $BZ_2T_4$. Ceramics containing H always display low Q probably due to the cation conductivity normally associated with this structural family. These results combined with the previous data permit construction of a schematic approximation for the $BaTiO_3$—$TiO_2$—ZnO— $Ta_2O_5$ system near $BT_4/B_2T_9$, FIG. 2. BTaT coexists with all compounds, and the volume is dissected into two quaternaries, both containing H.

Figure 2:
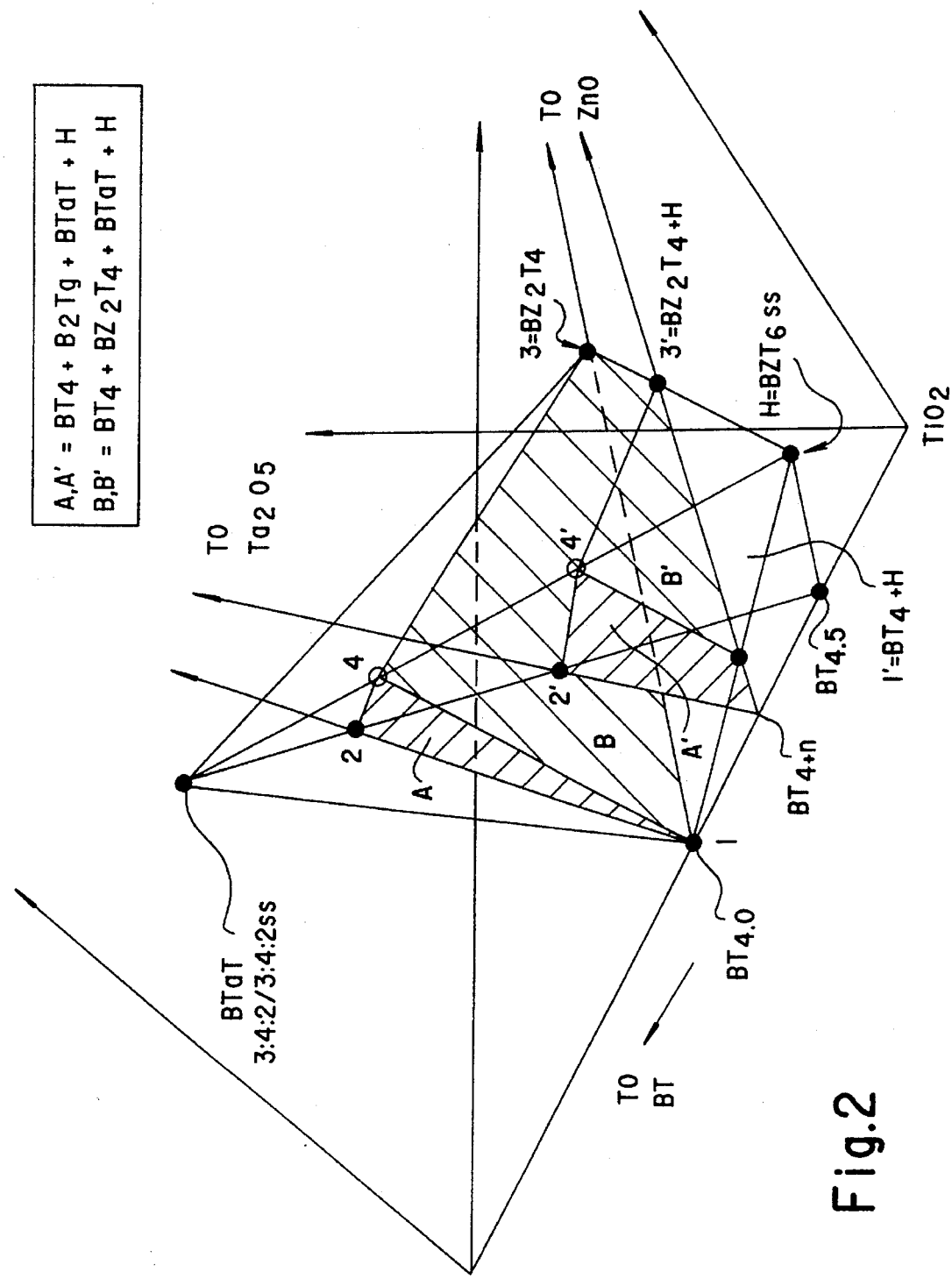
FIG. 2 is a schematic first approximation for the system $BaTiO_3(BT)$—$TiO_2$—$ZnO$—$Ta_2O_5$, also illustrating construction principles, wherein $BT_4$=$BaTi_4O_9$; $BT_{4.5}$=$Ba_2Ti_9O_{20}$. $BT_{4+n}$—$ZnO$—$Ta_2O_5$ pseudoternaries intercept tie lines at limiting and internal pierce points as numbered.

FIG. 2 is a good place to examine briefly the construction methodology adopted in this work. Pseudoternary n-planes, defined by $BT_{4+n}$—ZnO—$Ta_2O_5$, n=0($BT_4$) to n=0.5 ($B_2T_9$), are used to calculate and depict quaternary phase relations. When constructed through the quaternary, they intersect two-phase tie lines at a limiting or internal pierce point such as (2, 2') or (4, 4'), respectively. Interception of a three-phase triangle is the straight line segment between two pierce points. Segments, in turn, outline areas such as (A, A') and (B, B') that are four-phase tetrahedra.

Pierce points are particularly useful since their location can be precisely computed from experimental data that establish the pertinent two-phase assemblage reasonably well. Taking points (4, 4'), for example, and eliminating oxygen gives, (3x+y) $BT_{4+n}$+2x$Ta_2$+yZ→x$B_3Ta_4T_4$(BTaT)+y$BZT_6$(H)
where, (4x+6y)/(3x+y)=Ti/Ba=4+n.

Thus, the x/y ratio of products is fixed for a given n-plane and, from this, the balanced reaction is used to compute reactant percentages. Solid solution for the products BTaT and H is ignored since (4,4') positions do not vary significantly when all possible combinations of two-phase variants are computed.

Alternatively, pierce points can be computed from assumed tie line distributions in complex situations where experiemntal data appear contradictory or are inconclusive and/or incomplete. Their position in a given n-plane can be used to predict phase relations provided that Phase Rule principles are not violated. Using an iterative process, prediction can be compared with experiment until a model of the system is developed that best accounts for all data.

FIG. 2 is a model that cannot be correct for two reasons. First, it predicts that H must be present in all formulations and, therefore, that high Q ceramics are impossible. Second, it shows that $B_2T_9$ can never coexist with $BZ_2T_4$ since the $BT_4$—H equillibrium blocks the potential tie line. This creates a dilemma because experimental evidence from numerous compositions and from high Q ceramics is contradictory. The solution reduces to one of predicting and evaluating all possible tie line distributions and derivative n-plane constructions that will allow a $B_2T_9$—$BZ_2T_4$ tie line. Only one relatively simple model was found. It requires that small quantities of ZnO and $Ta_2O_5$ enter into solid solution primarily with $B_2T_9$ but also with $BT_4$. The two homogeneity regions generated, $B_2T_9$ss and $BT_4$ss, can be pictured as protruding into the quaternary volume. For unclear thermodynamic reasons, $BZ_2T_4$ establishes tie lines to $B_2T_9$ss (not $B_2T_9$), thereby avoiding a forbidden crossing of the H—$BT_4$ (or Hss—$BT_4$ss) tie line which passes through comositional space beneath (i.e., lower $Ta_2O_5$ content ) .

We propose that the necessary solid solutions are defect-free and of the coupled type according to $BaTi_{4-x}Zn_{x/3}Ta_{2x/}$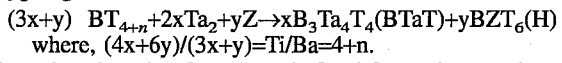

$_3O_9$(BT$_4$ss) and Ba$_2$Ti$_{9-x}$Zn$_{x/3}$Ta$_{2x/3}$O$_{20}$ (B$_2$T$_9$ss) . Some solid solutions, for example, BaTi$_{4-5x}$Ta$_{4x}$V$_x$O$_9$(V=vacancy), can be ruled out from construction considerations alone. However, models involving cation and anion vacancies combined with ZnO/Ta$_2$O$_5$ or Ta$_2$O$_5$ substitutions are possible, but tie line distributions associated with BT$_4$—B$_2$T$_9$—BNbT/BNbTss, as given in (R. S. Roth, L. D. Ettlinger, and H. S. Parker, "Phase Equilibria and Crystal Chemistry in the Ternary System BaO—TiO$_2$—Nb$_2$O$_5$, II.", J Solid State Chem ,68 330–39 (1987)), must be modified substantially. Such models are far too complex and speculative to advance. The simplest approach is forwarded since the goal is a realistic model for practical processing. Further, the prerequisite solid solutions and derivative quaternary constructions sought involve ZnO/Ta$_2$O$_5$ contents less than a few mol. %. These small quantities, however, are critical because they dictate stability of phase assemblages at larger concentrations and, ultimately, control ceramic properties.

XRD data from crushed ceramics and reacted powders (1300° C.) indicate that x in BT$_4$ss and B$_2$T$_9$ss is, indeed, small. BT$_4$ is single phase with larger cell parameters at x=0.05 but not at x=0.1. In multiphase assemblages, BT$_4$ also has this larger cell parameter. Similarly, B$_2$T$_9$ is single phase at x=0.1 but not at x=0.2. Changes in cell parameters for triclinic B$_2$T$_9$ are difficult to quantify since six variables are involved and important high angle XRD maxima are weak/diffuse. Conservative homogeneity ranges, $0.05 \leq x \ll 0.1$ and $0.1 \leq x \ll 0.2$, therefore, are adopted for BT$_4$ss and B$_2$T$_9$ss, respectively. Additional support from other data requiring these solid solutions is discussed later.

Using the available data, the position of all possible pierce points representing all possible tie lines associated with all compounds and solid solutions was calculated for sections, $0 \leq n \leq 0.5$. Points involving solid solutions (H, BT$_4$ss, and B$_2$T$_9$ss) are special and are contained in all n-planes along a trajectory generally defined by a straight line. They originate from a limiting point where solid solution is essentially zero in all n-planes and terminate within each n-plane when solid solubility is at maximum. A special trajectory can be pictured as the locus of all pierce points having the same nominal phase assemblage. At least one member varies in composition and, hence, multiple piercings occur in each n-plane. Since solid solubility varies with temperature, it follows that n-planes must display this and any other temperature dependent feature implicitly by the composition variable.

The proposed model for the system at n=0 up to 1300° C. is illustrated schematically in FIG. 3. Sections with n>0 are similar but all phase fields involving H expand and encroach into adjacent areas. BZ$_2$T$_4$ establishes the required tie line to B$_2$T$_9$ss while maintaining tie lines to all other phases. A four-phase field is generated that excludes the H phase, as demanded for high Q ceramics. If ZnO did not participate in solid solutions, however complex, this field would not be truncated and BZ$_2$T$_4$ would exist up to the limiting BT$_{4+n}$—Ta$_2$O$_5$ pseudobinary. XRD and electrical data do not support this construction.

FIG. 3 shows an interruption (open circles) along the special trajectory, BT$_4$ss+B$_2$T$_9$ss. Below about 1240°, an unusual but reversible reaction is observed. BT$_4$ss, normally dominant above 1240° C., diminishes to near zero while the B$_2$T$_9$ ss content increases. A phase that resembles B$_4$T$_{13}$ simultaneously appears. Whether it is a B$_4$T$_{13}$-type solid solution or another polytitanate is not clear for reasons discussed above. However, we believe that reactions involving more than one such phase intervene in this compositional interval.

The reader should not conclude that a BT$_4$ss variant is decomposing. What is being observed in $n \geq 0$ planes is the manifestation of phase assemblage changes in the adjacent quaternary volume, n<0. Such changes are a function of temperature when BT$_4$ss members (i.e., entirely in the n<0 volume) participate. Although many distributions can be hypothesized, tie lines associated with BT$_4$/BT$_4$ss, B$_4$T$_{13}$, and at least two of the polytitanates are mandatory. Obviously, if more than one of the participating phases has a homogeneity region, tie line distribution is further complicated by temperature. Fortunately, an analysis of the adjacent volume is simplified because only equilibrium that includes a B$_2$T$_9$ss member can appear within $n \geq 0$ planes.

For practical processing purposes, complete reaction details and identification of specific phases are not crucial. The notation B$_4$T$_{13}$ss is adopted hereafter to encompass all possible combinations of B$_4$T$_{13}$, the polytitanates, and pertinent solid solution variants. Numerous pierce points are derived when tie line distributions among B$_4$T$_{13}$ss and BT$_4$ss/B$_2$T$_9$ss are computed. These cluster within a narrow composition window on and in close proximity to the BT$_4$ss+B$_2$T$_9$ss trajectory, FIG. 3. From these new pierce points, an elegant construction that represents all permissible tie line distributions is derived. Construction for intervening reactions, however, is simplified in all diagrams since more work is necessary to determine which are relevant. Nevertheless, note that the model can account for reactions observed below 1240° C. simply by eliminating constructions involving BT$_4$ss, B$_2$T$_9$ss, BTaTss, and BZ$_2$T$_4$ beyond the open pierce points. The area of phase assemblages involving B$_4$T$_{13}$ss that is then fully exposed has special property/processing implications.

FIG. 3 contains an additional complication. The model demands that the B$_2$T$_9$ss+BTaT trajectory must deviate at some point, sharply or curvilinearly, toward the BT$_{4+n}$—ZnO boundary. This construction has reasonable chemical significance since B$_2$T$_9$ss (and BZ$_2$T$_4$) at some value of x is free to establish tie lines not only to pure BTaT but to BTaTss members. Experiments with one bulk composition, Ba$_4$Ti$_{13-x}$Zn$_{x/3}$Ta$_{2x/3}$O$_{30}$(x=0.3), in the n=–0.825 volume confirmed this feature. B2T$_9$ss was found to coexist with a BTaTss variant (XRD lines shifted) and, as important, with B$_4$T$_{13}$ss phase(s).

Although we grant that many details need research to define the system accurately, the oversimplified model accounts for all available experimental data. Furthermore, it provides a framework which guides processing almost precisely toward composition/temperature regimes that are necessary to obtain and/or adjust desired electrical properties.

3. Chemistry and Electrical Properties

FIGS. 4, 5, and 6 show experimental results to 1300° C. for n=0, 0.2, and 0.3, respectively, conforming in scale to the model in FIG. 3. High Q ceramics correlate with three- and four-phase regions containing B$_2$T$_9$ss, BT4ss, BTaTss, and BZ$_2$T$_4$. The surrounding fields include H which degrades Q and, hence, are forbidden regions. As n increases, low Q fields expand and shrink the stability range of high Q compositions. For practical processing, the best formulations are limited to $0 \leq n \leq 0.2$ with only one minor drawback related to $T_f$ (see below).

FIGS. 7 and 8 show electrical and more detailed compositional data for n=0, 0.1, 0.2, and 0.3 sections. Ceramics are characterized near 4.5 GHz and those with Q>10K are candidates for cellular filters. The broadest high Q/T$_f$ range, 14 to –7 ppm/° C., exists in the n=0 section. Dielectric constants decrease from about 38 ($BT_4$) to 34 as $T_f$ decreases. Small variations in $Ta_2O_5$ do not influence $T_f$ significantly but its presence is required to produce high Q. Note, for example, lower Q when $Ta_2O_5=0$ for the phase assemblage $BT4+BZ_2T_4$. In contrast, the assemblage $BT_4+B_2T_9+BTaT$ at $ZnO=0$ displays excellent Q.

Electrical data reinforce several features of the proposed model that are important to processing. Although plots of $T_f$ versus vol.% ZnO (or $BZ_2T_4$) may be more rigorous, use of mol. % is justified since $BT_4$, $B_2T_9$, and $BZ_2T_4$ have similar density, 4.5–4.8 g/cc. Also, the volume fraction of BTaTss (~6.6 g/cc) is small and nearly constant, ~0.05, in almost all compositions. The $T_f$ function is roughly linear and can be extrapolated to $ZnO=0$ and toward larger ZnO concentrations. This is equivalent to a line that can be constructed in a $BT_{4+n}$—$Ta_2O_5$ pseudobinary, through/near the compositional data, for example, in FIG. 4, to the ZnO—$Ta_2O_5$ binary. With nearly constant $Ta_2O_5$, the line is parallel to $BT_{4+n}$— ZnO.

At ZnO=0, the extrapolation predicts a phase assemblage of $BT4+ B_2T_9+BTaTss$ having a $T_f$ more positive than $BT_4$(n=0) or $BT_4+ B_2T_9$ (n>0). In fact, a lower value (e.g. n=0) is observed indicating that the assemblage is not possible and that $T_f$, therefore, must be discontinuous below 10 mol. % ZnO. This correlates with the truncation of the high Q field below several mol. % ZnO where $BZ_2T_4$ and BTaTss, being unstable, yield to equilibrium associated with BTaT. Clearly, however, BTaTss does have a $T_f$ that is more positive than BTaT, and it is this $T_f$ that influences high Q composites. The argument also is consistent with BNbTss stoichiometry since $TiO_2$, $T_f=400$ ppm/° C., substitutes for $Nb_2O_5$. Electrical data for BMeT/BMeTss variants will be published elsewhere.

As $T_f$ decreases from $BT_{4+n}$—$Ta_2O_5$ toward ZnO—$Ta_2O_5$, the line in every n-plane intersects a limiting ZnO concentration. This point is where its trajectory crosses from high Q compositions into the lower Q field containing H. $T_f$ and construction details show that the H field is intercepted near 50, 30, and ~10 mol.% ZnO at n=0, 0.2, and 0.3 respectively. Interestingly, the transition region is not marked by a major $T_f$ discontinuity, suggesting that the $T_f$ of H is small.

Further analysis of the $T_f$ function provides other important implications. $BZ_2T_4$ lowers Q and É or $BT4/BT_4ss$, but companion phases $B_2T_9ss$ and BTaTss offset the former and prevent a sharp drop for the later. Overall control of $T_f$ appears to be via $BZ_2T_4$, computed to be –10 to –15 ppm/° C., but the situation is more complex. Consider any $T_f$, for example, the zero value which can be obtained from an infinite number of compositions from n=0 to, at least, n=0.2. $T_f$ values are confined on and within the high Q boundary lines, $BZ_2T_4+BT_4ss+B_2T_9ss$ and $BZ_2T_4+B_2T_9ss+BTaTss$. Small changes in $Ta_2O_5$ content from the first to the second, at constant ZnO and n, produce more $B_2T_9ss$ and BTaTss since $BT_4ss$ is consumed. Increasing n at constant ZnO/$Ta_2O_5$ accomplishes a similar result, but the volume fractions of $BZ_2T_4$ and BTaTss also decrease. For the former case, the negative $T_f$ of $BZ_2T_4$ is compensated by $BT_4ss$, $B_2T_9ss$, and BTaTss. Consumption of $BT_4ss$ by small $Ta_2O_5$ variations, therefore, does not change $T_f$ significantly. In the latter case, however, a net loss of positive $T_f$ results. Less ZnO($BZ_2T_4$), therefore, is required to keep $T_f$ constant as observed. É also tracks these changes in phase content, increasing at constant $T_f$ as n increases or as $T_f$ becomes more positive (less $BZ_2T_4$) at constant n.

The dimensions of cellular filters are defined at fixed frequency by É in the 34–38 range. Once specified, it is difficult to substitute another ceramic that differs by more than 0.5 units. The É of these composites, however, can be fine tuned by adjusting n without disturbing $T_f$. This flexibility can lead to potential problems in some filter devices for which $T_f$ is specified only in simiplest linear form by $\Delta f/f\Delta T$ (f=reference frequency) from RT to 60° C. FIG. 9 illustrates αf/f versus temperature for composites with Tf=0; $B_2T_9$ and a composite containing $SnO_2$ are shown for reference. When n=0, Tf maintains excellent linearity for composites in the 0±4 ppm/° C. range. Curvilinear behavior is observed for higher É ceramics from n>0 sections that contain larger volume fractions of $B_{\geq}T_9ss$. This characteristic, unique to $B_2T_9$, is mirrored by Q versus temperature (see above). If not considered in early design stages, the filter manufacturer may experience compensation difficulties at low temperature. This system, however, offers another route that helps to minimize the problem.

Less expensive $Nb_2O_5$ can be substituted for $Ta_2O_5$. It increases É by nearly one unit and $T_f$ by about 0.5 ppm/° C. at equivalent bulk chemistry and near theoretical density. The economic benefits are partly offset, however, by processing penalties as summarized in Table II. $Nb_2O_5$ variants begin to melt above about 1290° C. and excellent properties consistent with the expected phase assemblage are obtained only between 1260°–1280° C. Ceramics densified below 1260° C. show higher $T_f$/É and lower Q. XRD data reveal that densification occurred in the regime characterized by the intervening reactions observed for $Ta_2O_5$. Favorable properties are restored by refiring the ceramics above 1260 ° C. where the phase assemblage changes accordingly. Practical cooling rates through the zone of intervening reactions are not a problem since the reverse reaction(s) is sluggish.

Intervening reactions clearly are shifted about 200 ° C. upward into the densification range of $Nb_2O_5$ composites. We believe that this reflects a small incrase in the solubility of $Nb_2O_5$ in BT4 and/or $B_2T_9$ or in phases within n<0 sections. In fact, the model in FIG. 3 predicts this very situation when larger homogeneity ranges are imposed. Substitution of 25% $Ta_2O_5$ for $Nb_2O_5$ eliminates all problems. Economic: issues are balanced not only by higher yields but by additional procesing flexibility. É can be tuned for a constant $T_f$ by varying the $Ta_2O_5/Nb_2O_5$ ratio starting near n=0 to minimize $T_f$ curvature and the associated Q decrease below RT. If É requires further adjustment, only small changes in n are necessary.

FIG. 10 compares Q versus frequency for a variety of ceramics based on barium titanates. Data for three frequencies are shown as straight line segments for simplicity. To obtain internally consistent data, smaller samples for the two higher frequencies were extracted from large pucks, ~7 cm OD by 2 cm thick, first measured near 1 GHz. Q for the new ceramics is not impressive at elevated frequencies. At cellular frequencies, however, Q is outstanding, 30-40K being routine and over 40K not uncommon. Mechanisms to explain this feature are clearly needed.

4. The Manganese Additive

When cooled to RT from densification, these new composites retain bluish cores that are characterized by low Q. Firing in oxygen improves Q slightly. Reoxidation by annealing invites property degradation from intervening reactions. In contract, pure $BT_4/B_2T_9$ composites (>15 mol. % $B_2T_9$) core from a higher practical densification range, 1300°–1350 °C., but oxygen eliminates the problem. Coring signals that complex acceptor/donor defect chemistries are operating in the grain boundary region and/or that the much more complicated bulk solid solution mechanisms alluded to above are involved. Difficult research, perhaps drawing from the extensive literature on $BaTiO_3$ (e.g. Yet-Ming Chiang and Touichi Takagi, "Grain-Boundary Chemistry of Barium Titanate and Strontium Titanate, I.", J. Am. Ceram. Soc., 73 [11] 3278–85 (1990); and Yet-Ming Chiang and Touichi Takagi, "Grain Boundary Chemistry of Barium Titanate and Strontium Titanate, II" J. Am. Ceram. Soc., 73 [11] 3286–91 (1990)), is needed to characterize these specific composites.

It was found necessary to acceptor-dope all formulations with manganese. Although a lower concentration limit was not established, Mn contents from 0.02 to 0.1 wt.% yield uncored, high Q product. In a very general sense, Mn clearly behaves as a compensator in defect equilibria, probably helping to maintain $Ti^{4+}$ according to the often postulated reaction, $Nn^{3+} + Ti^{3+} \rightarrow Mn^{2+} + Ti^{4+}$. While this function may be important, it also is possible that some of the Mn participates in bulk phase assemblages, particularly $BT_4ss/B_2T_9ss$. Three types of substitution, dictated by decreasing temperature, are possible according to, $Mn^{2+} + 2\ Me^{5+} \rightarrow 3\ Ti^{4+}$, $Mn^{3+} + Me^{5+} \rightarrow 2\ Ti^{4+}$, and $Mn^{4+} \rightarrow Ti^{4+}$.

The amounts of Mn used are in the range of $ZnO/Ta_2O_5$ concentrations proposed in $BT_4ss/B_2T_9ss$. If Mn participates as above, the model in FIG. 3 cannot be precisely correct since the system now involves up to six components. In particular, solid solution trajectories must include multiple deflections associated with the temperature dependent substitutions. Indeed, the minimum homogeneity limits, x, in $BT_4ss/B_2T_9ss$ demanded by the model can be satisfied in part by incorporation of Mn.

Practical questions of how/when to add the Mn dopant cannot be underestimated. Uniform dispersal of small quantities requires use of solutions such as Mn-nitrate. For large filter parts, typically containing PVA binder, Mn must be added to raw material blends and not to calcined/milled powders. In the latter case, the Mn precursor not only decomposes but catalyzes oxidation of the binder during initial stages of firing. The combination causes rapid generation of gases that catastrophically destroy the parts. Slower heating cycles are helpful but are an unnecessary burden.

The electrical properties of $BT_4/B_2T_9$ based ceramics are profoundly influenced and controlled by subtle factors that are easily overlooked. Raw material impurities (<0.2 wt. %) diminish Q by a factor of two. Low concentrations of lattice defects generated by reduction degrade Q by almost 100%. Minor contaminants from certain milling media and extrusion binders degrade Q by 15–20%. A transition involving small displacements of Ba in $B_2T_9$ may explain the Q decrease and the corresponding $T_f$ curvature observed below 25° C. Small amounts of liquid phase from at least two origins contribute to anomalous grain growth which not only degrades the mechanical properties of $BT_4$ but causes abnormal $T_f$ due to traces of unreacted $TiO_2$.

Composites containing $ZnO/Me_2O_5$ are unique in that a small amount of solid solubility excludes a lossy hollandite phase thus allowing for a high Q phase assemblage. Small variations in solid solution, in turn, diminish Q by shifting undesirable phase assemblages into the densification range of composites containing $Nb_2O_5$. Finally, small concentrations of Mn are required to help compensate defect equilibria and, thereby, establish high Q.

Among microwave ceramics, the prominence of the older barium titanates is re-established by recognizing the above basic factors. Further property improvements can be obtained using specific mechanisms generalized in this report.

In order to make the ceramic compositions of the present invention, in general, standard ceramic procedures can be used. The preferred milling media is zirconia in order to avoid contamination by alumina or silica. The raw materials, particularly $TiO_2$ and $BaTiO_3$, must be free of significant amounts of impurities, e.g., silica, alumina and phosphate impurities. When no $Ta_2O_5$ is employed, the materials are fired (densified) in air or oxygen at greater than 1240 degrees C. (to avoid low Q phase assemblages) and less than 1290 degrees C. (to avoid partial melting). When $Ta_2O_5$ is employed up to 99.9 wt. percent, the firing range can be expanded up to 1300 degrees C. When Mn is employed, it is preferably added when the raw materials (e.g., $BaTiO_3$, $TiO_2$, $Nb_2O_5$, and ZnO, or other combinations of precursors) are blended in order to avoid problems which may occur if it is added after calcining the basic set of raw materials, as discussed below. The composition can be formed into a final product by any suitable method, e.g., die pressing, isostatic pressing, extrusion, slip casting, etc.

TABLE I

Important Processing/Property Features
For $BaTi_4O_9/Ba_2Ti_9O_{20}$ Ceramics
$BT_4$: $\varepsilon \approx 38$, $T_f = 14$ ppm/°C., Q > 13K (4.5GHz).
$B_2T_9$: $\varepsilon \approx 39$, $T_f = 4$ ppm/°C., Q > 12K.
$BT_4/B_2T_9$ composites: intermediate properties.
$Ba_2Ti_{9-x}Sn_xO_{20}$ ($B_2T_9ss$) and/or $BaTi_{4-x}Sn_xO_9/$
$B_2T_9ss$ composites: $\varepsilon \approx 36–37$, Tf < 4 ppm/°C., Q = 9–11K.

| Property | Major Factors/Causes/Symptoms | Material |
|---|---|---|
| Low Q | Lossy secondary phases.<br>. phosphorus, silicon in lower purity (LP) raw materials, $BaTiO_3$, $TiO_2$.<br>. alumina milling media, Na impurities in cellulose binders. | All |
| | Reduction, 1300–1375° C.<br>. Oxygen vacancies compensated by $Ti^{3+}$.<br>. dark cores due to incomplete reoxidation during cooling; LP ceramics reoxidize faster than high purity (HP) materials.<br>. annealing not practical for large parts; eliminated by oxygen. | All except $BT_4$ |

TABLE I-continued

Important Processing/Property Features
For $BaTi_4O_9/Ba_2Ti_9O_{20}$ Ceramics
$BT_4$: $\acute{\epsilon} \approx 38$, $T_f = 14$ ppm/°C., Q > 13K (4.5GHz).
$B_2T_9$: $\acute{\epsilon} \approx 39$, $T_f = 4$ ppm/°C., Q > 12K.
$BT_4/B_2T_9$ composites: intermediate properties.
$Ba_2Ti_{9-x}Sn_xO_{20}$ ($B_2T_9$ss) and/or $BaTi_{4-x}Sn_xO_9/$
$B_2T_9$ss composites: $\acute{\epsilon} \approx 36$–37, Tf < 4 ppm/°C., Q = 9–11K.

| Property | Major Factors/Causes/Symptoms | Material |
|---|---|---|
| Abnormal $T_f$, Poor mechanically | Unavoidable anomalous grain growth (AGG).<br>. 50–500 gm crystallites; liquid phase from (LP), ~1275° C.<br>. chips, cracks, pullouts from machining; fine surface finish substrates not possible.<br>Avoidable AGG.<br>. 50–500 μm crystallites; liquid phase from incompletely reacted $BaTiO_3/TiO_2$, ≧ 1300°/C.,<br>. $T_f = 20$–30 ppm/°C. when AGG rate exceeds reaction rate to $BT_4$; remnant $TiO_2$, (400 ppm/°C.) isolated. | All (LP) $BT_4$-rich<br><br><br><br>All (HP) with $BT_4$ > 85 mol. % |
| Anomalous Q | A phase transition near 25° C.? | All $B_2T_9$- rich |

TABLE II

Comparison of Ceramics Containing $Ta_2O_5$ and $Nb_2O_5$

| | Me = Ta* | | | Me = Nb* | | | Phases* | |
|---|---|---|---|---|---|---|---|---|
| T (°C.) | $\acute{E}$ | Q | $T_f$ | $T_f$ | Q | $\acute{E}$ | Me = Ta | Me = Nb |
| 1300 | 35.6 | 10,050 | −0.4 | — | — | — | $BZ_2T_4 + BT_44ss + B_2T_9ss + BTaTss$ | Melting |
| 1275 | 35.6 | 10,050 | −0.6 | 0 | 10,700 | 36.4 | $BZ_2T_4 + BT_44ss + B_2T_9ss + BTaTss$ | $BZ_2T_4 + BT_4ss + B_2T_9ss + BNbTss$ |
| 1240 | 35.7 | 10,050 | −0.3 | 1.0 | 8,600 | 37.1 | $BZ_2T_4 + BT_44ss + B_2T_9ss + BTaTss$ | $BZ_2T_4$ $BT_4ss$ (Decreased) $B_2T_9ss$ (Increased) $B_4T_{13}ss$ Present |

*4.5 GHz electrical data; bulk composition is 62, 35, 3 mol. % $BT_4$, ZnO, and $Me_2O_5$, respectively.

As was previously mentioned, the subject invention is directed to ceramic materials which contain, on a compositional basis, oxides of barium, titanium, zinc and niobium. These materials include compositions which may be defined according to the general formula $BaTi_{(4+n)}O_{(9+2n)}$ where n ranges from −0.2 to 0.5, such as, for example, $BaTi_4O_9$ and/or $Ba_2Ti_9O_{20}$, and oxides of zinc such as ZnO and oxides of niobium such as $Nb_2O_5$. The presently preferred range for n in the above formula is 0 to 0.5, particularly 0 to about 0.3. Preferably these oxides of barium and titanium as set forth above included in the compositions comprise a major proportion, for example, at least about 50%, more preferably at least about 60 percent by mole, up to about 90 mole percent or more of the composition, those compositions containing about 60 to 70 mole percent being particularly preferred.

The zinc generally forms a minor but significant component of the compositions such as, for example, from about 5 mole percent up to about 50 mole percent, preferably about 15 to 40 mole percent. Niobium generally may be included in very minor proportions such as, for example, about 0.1 to about 10 mole percent but generally at least about 1.0 mole percent up to about 10 mole percent. Preferred inclusions of niobium are from about 2 to about 5 mole percent, particularly preferred inclusions being from about 3 to about 5 mole or even about 3 to about 4 mole percent. In accordance with the concepts of the present invention, some (up to about one half or more) but not all of the niobium in the niobium-containing component further may be replaced by a tantalum containing component.

The subject compositions have microstructures and, especially, microchemistries which are not entirely understood at present. However, the microstructure appears to consist of a composite of multiple crystalline phases and generally has an uniform grain size of about 3 to 5 microns containing the crystalline phases of $BaTi_4O_9$, and/or $Ba_2Ti_9O_{20}$ alone or their solid solutions which contain very small amounts of the oxides of zinc, tantalum and niobium. Generally, no abnormal crystalline grain growth of these phases, which is oftentimes typical of ceramic compositions containing a significant amount of $BaTi_4O_9$, has been observed.

The compositions of the present invention also appear to contain another crystalline phase containing the oxides of barium, titanium and zinc as indicated by optical and electron microscopy as well as X-ray diffraction. This phase typically has a grain size of about 5 to 10 microns. While not wishing to be bound by the following, this latter crystalline phase appears to have the formulation close to $Ba_3Ti_{12}Zn_7O_{34}$ as this formulation tends to somewhat correspond with the X-ray evidence of the phase. In addition, solid solubility of the ZnO component alone in the $BaTi_4O_9$ and $Ba_2Ti_9O_{20}$ phases has not been observed but there appears to be a slight solubility of $Nb_2O_5$ plus ZnO, thought to be less than about 4 mole percent, in these two phases.

As was mentioned previously, n in formula $BaTi_{(4+n)}O_{(9+2n)}$ can vary from −0.2 to 0.5. When n is less than zero, it is important that the ceramic materials of the invention include sufficient amounts of Zn and Nb such that the final composition includes three phases such as, for example, $BaTi_4O_9$, $Ba_3Ti_{12}Zn_7O_{34}$ and $Ba_3Ti_4Nb_4O_{21}$, or $Ba_2Ti_9O_{20}$, $Ba_3Ti_{12}Zn_7O_{34}$ and $Ba_3Ti_4Nb_4O_{21}$, in order to achieve the desired characteristics for the ceramic material.

Methods or processes for preparing the ceramic compositions according to the present invention may vary considerably depending upon, among other things, the particular composition of the ceramic material, the desired properties of the material depending upon its intended use, the manners in which the material is treated, and the like. The subject ceramic compositions can generally be obtained by typically practiced processes as are well known in the art to which the present invention pertains. Such conventional processes may be conducted without any special or additional processing procedures.

Thus, for example, source materials comprising oxides of the desired metals having valencies the same or different from the valencies in the resulting ceramic composition may be suitable. These source materials may be mixed in the desired proportions and then fired at an elevated temperature in a suitable atmosphere so as to convert the source materials to the appropriate compounds or compositions and to densify the composition. Oxides of the metals in the source materials may be replaced in whole or in part with carbonates, hydroxides and the like. Generally speaking, any source material which upon firing yields the desired oxide can be utilized.

More specifically, compositions of the invention may be prepared by initially mixing or otherwise combining oxides and/or carbonates of Ba, Ti, Zn and Nb in the appropriate proportions. Suitable oxides and carbonates of the above elements include $BaTiO_3$, $ZnO$, $Nb_2O_5$, $BaCO_3$, $Ba(OH)_2$, $BaTi_4O_9$, $Ba_2Ti_9O_{20}$, $ZnNb_2O_6$ and the like which when combined in the appropriate proportions will result in the desired composition for the ceramic. Presently preferred source materials include materials such as $BaTiO_3$, $TiO_2$, $ZnO$ and $Nb_2O_5$.

When mixing is used to combine the starting ingredients or source materials, mixing can be accomplished by wet blending in a suitable liquid vehicle such as water optionally in the presence of mixing or blending media such as alumina or zirconia spheres. After a thorough mixing, the source materials are dried at room or an elevated temperature to drive off the vehicle and then calcined in a suitable atmosphere such as an oxidizing atmosphere like air, enriched air or oxygen so as to convert, for example, carbonates to oxides and/or change the valencies of the oxides from that of the source material. Suitable temperatures for calcining are generally in the range of up to about 1000° C. to about 1300 ° C. or more, preferably about 1050° C. to about 1125° C. The time period used for calcining depends upon, among other things, the time necessary to ensure that the desired reactions have been achieved from the source materials and is generally in the range of about 1 to about 6 hours.

The loose ceramic powder obtained after calcining then may be milled or otherwise comminuted to the desired particle size for final compaction. Generally, the powder is reduced to a fine particle size, typically an average particle size of less than about 10 μm, preferably to an average particle size of about 1 to 2 μm, such as by grinding while the powder is wetted by a liquid vehicle such as distilled water and using a grinding media such as alumina or zirconia spheres. After the milled calcined powder is dried such as by air drying or spray drying, the powder mixture is compacted by any suitable process including isostatic pressing, uniaxial pressing, molding, extrusion and the like into the desired final shape.

The shaped compact is then fired at a temperature of at least as high and preferably greater, than the calcining temperature. Generally the firing temperature is in the range of about 1100° C. to 1350° C. or more, preferably about 1225° to 1300° C. Again the firing is preferably conducted in an oxidizing atmosphere such as air or oxygen and for a period of time necessary to achieve the desired final characteristics for the compact, generally a time period of about 1 hour to about 6 hours or more. Preferably, the resultant fired compacts of the ceramic composition have a density of at least about 98 percent of theoretical density to achieve optimum properties.

It has been found that an important consideration in conducting the procedure of firing the compacted ceramic composition to yield the final ceramic product may be the inclusion of a small amount of firing but not a sintering aid in the compact prior to firing. Inclusion of such an aid tends to prevent the various oxides in the densified, reacted, ceramic from losing oxygen (reducing) and thus converting to other oxide forms during firing and in the subsequent cool-down phase. It is believed that the firing aid may absorb free electrons and thus help prevent the loss of oxygen from the compact. The composition of the aid may vary considerably but it has been found that the inclusion of manganese such as in its oxide form, generally in amounts less than about 1 mole percent, preferably 0.01 to 0.1 mol percent, provide excellent results in terms of minimizing oxygen loss from the compact. The aid may be incorporated into the composition at various points in the procedure of preparing the ceramic compositions, it being presently preferred to add the aid such as manganese oxide as an aqueous solution or suspension prior to drying of the comminuted powder. Inclusion of quite small amounts of the firing aid are presently preferred as significantly greater amounts may modify the structure of the final composition, particularly the microchemistry of the ceramic, which may adversely affect the final electrical and physical properties of the composite product, particularly the Q factor.

It has also been found that the inclusion of significant amounts of impurities, particularly in the raw material source providing the Ti component, should be avoided. For example, it has been found that high purity titanium oxides, that is, having a purity of at least 99.5 percent, preferably at least about 99.9 modified percent, should be used in order to avoid detrimental effects on, for example, the electrical properties of the final ceramic composition, especially the Q factor. Contaminants such as phosphorus and silicon which are common and may be contained in source materials such as titanium dioxide are to be particularly avoided if at all possible. Such high purity titanium oxides (99.9 percent) in the form of titanium dioxide powders are commercially available from various sources.

As was mentioned previously, the ceramic compositions according to the present invention have an excellent overall combination of electrical and physical properties making the compositions particularly suitable for use in dielectric resonators for microwave communication applications. That is, each of the compositions has an excellent combination of high Q value or low dielectric loss, high dielectric constant and low temperature coefficient of resonance frequency. More specifically, the ceramic compositions generally have a Q value of 30,000 or more when measured at about 900 MHz (cellular telephone frequency), a highly acceptable dielectric constant of at least 30, and a relatively stable resonant frequency temperature coefficient of near zero.

Contrary to generally accepted beliefs in the ceramic arts, particularly the ceramic arts relating to dielectric materials for microwave applications and the like, the inclusion of niobium in the compositions does not appreciably degrade the electrical and physical properties of the compositions as might normally be expected. More specifically, it has been the generally accepted consideration in the art that the substitution of niobium for tantalum in known ceramic compositions produces compositions having a significantly reduced Q value, reductions of such significance that the compositions would be useless in most if not all microwave applications. Quite surprisingly, it has been found that, contrary to the above expectations, the subject compositions have Q value comparable or even greater than similar compositions containing tantalum instead of niobium.

It is also to be specifically noted that the compositions of the present invention are relatively more economical to produce, particularly when compared with ceramic compositions of similar compositions which contain tantalum. As was set forth previously, tantalum in either the elemental or oxide form is very expensive at current market prices whereas niobium has a current market value considerably less than tantalum, generally on the order of about 10 to 20 percent of the cost of tantalum. As a consequence, ceramic compositions containing niobium which have comparable or even better electrical characteristics, particularly for microwave applications, than those of similar composition containing tantalum can be produced at significantly reduced costs.

Specific ceramic compositions according to the invention are presented in the following examples. It should be understood that the examples are given herein for the purposes of illustration and do not limit the invention as has been heretofore described to these particular examples.

EXAMPLE 1

A composition according to the invention was prepared, formed into a sintered compact and then tested for electrical properties to determine its suitability for a dielectric resonator for microwave applications.

Appropriate amounts of $BaTiO_3$, titanium dioxide, zinc oxide and niobium pentoxide in the form of powders were mixed to yield upon further sintering the ceramic composition according to the invention. The amounts of the starting materials in terms of mol percentages are set forth in Table III. Mixing of the powders was accomplished by wet blending in water. After a thorough mixing, the blended powder slurry was dried at an elevated temperature overnight to drive off the water to yield an essentially dry powder. Calcining of the mixed powders was then conducted in an air atmosphere at a temperature of about 1100° C. for about 4 hours to react the starting oxides.

The loose ceramic powder obtained after calcining was then milled in distilled water, using zirconia spheres, to an average particle size of about 1 to 2 μm. During milling, an aqueous suspension containing an appropriate amount (0.05–0.1 wt.%) of manganese dioxide was added as a firing agent. The milled powder was dried by spray drying and the dried powder compacted by uniaxial pressing under an applied pressure of 100 MPa into a puck-like shape. The compacted and shaped mixture was then fired at a temperature of 1250° C. The firing was conducted in an oxygen enriched air atmosphere for a time period of about 4 hours and then cooled to room temperature. Circular specimens for electrical testing at ~4.5 GHz were extracted from the puck.

These specimens had dimensions of about 0.5" OD by 0.2" thick.

The completed ceramic composition was subjected to analysis and from X-ray diffraction appeared to contain at least the phases of $BaTi_4O_9$, $Ba_2Ti_9O_{20}$ and $Ba_3Ti_{12}Zn_7O_{34}$, as major phases; these phases being present in amounts of at least 5 percent by volume. Phases less than 5 percent were not determined. The composition was then tested for electrical characteristics of Q value at 4.0–4.5 GHz, $T_f$ value and dielectric constant (É). Although the Q value for the sample was measured at frequencies which are not in the cellular telephone range, the Q values give an approximate indication of the Q value in (850–900 MHz) even though there is not a strict linear relation for Q between the two ranges of measurement. The results of these electrical tests are shown in Table III.

EXAMPLE 2

The above procedure was essentially repeated to produce another ceramic composition in accordance with the present invention. The test sample of the ceramic composition was a circular puck having a diameter of about 2½ inches and a thickness of about 1 inch. The sample was formed from the compositions set forth in Table III and the major crystalline phases present as determined by X-ray diffraction were $BaTi_4O_9$, $Ba_2Ti_9O_{20}$ and $Ba_3Ti_{12}Zn_7O_{34}$. In addition to testing for the electrical characteristics as set forth in Example 1, the Q value at 850–900 MHz was also determined since this is the test frequency range most indicative of the applicability of the composition for use as a dielectric resonator and the size of the sample prepared enabled such a determination to be easily made.

EXAMPLE 3

The procedure of Example 1 was essentially repeated to produce a different ceramic composition in accordance with the present invention which had a size of sample according to Example 2. The ceramic was formed from the composition listed in Table III and the major crystalline phases present as determined by X-ray diffraction were $BaTi_4O_9$, $Ba_2Ti_9O_{20}$ and $Ba_3Ti_{12}Zn_7O_{34}$. The electrical characteristics of the sample are also shown in Table III.

EXAMPLE 4

The procedure of Example 1 was essentially repeated to produce a dufferent ceramic composition in accordance with the present invention which had a size of sample according to Example 2. The ceramic was formed from the composition listed in Table III and the major crystalline phases present as determined by X-ray diffraction were $BaTi_4O_9$, $Ba_2Ti_9O_{20}$ and $Ba_3Ti_{12}Zn_7O_{34}$. The electrical characteristics of the sample are also shown in Table III. The materiacl had a relatively higher Q value at the tested frequency.

EXAMPLE 5

The procedure of Example 1 was essentially repeated to produce a difference ceramic composotion in accordance with the present invention. The ceramic was formed from the composition listed in Table III and the major crystalline phases present as determined by X-ray diffraction were $BaTi_4O_9$, $Ba_2Ti_9O_{20}$ and $Ba_3Ti_{12}Zn_7O_{34}$. The electrical characteristics of the sample are also shown in Table III.

EXAMPLE 6

The procedure of Example 1 was essentially repeated to produce a different ceramic composition in accordance with the present invention which had a size of sample according to Example 2. The ceramic was formed from the composition listed in Table III and the major crystalline phases present as determined by X-ray diffraction were $BaTi_4O_9$, $Ba_2Ti_9O_{20}$ and $Ba_3Ti_{12}Zn_7O_{34}$. The electrical characteristics of the sample are also shown in Table III. The material had an excellent value for $T_f$ of near zero.

EXAMPLE 7

The procedure of Example 1 was essentially repeated to produce a different ceramic composition in accordance with the present invention. The ceramic was formed from the composition listed in Table III and the major crystalline phases present as determined by X-ray diffraction were $BaTi_4O_9$, $Ba_2Ti_9O_{20}$ and $Ba_3Ti_{12}Zn_7O_{34}$. The electrical characteristics of the sampe are also shown in Table III.

EXAMPLE 8

The procedure of Example 1 was essentially repeated to produce a different ceramic composition in accordance with the present invention which was formed from a size of sample according to Example 2. The ceramic had the composition listed in Table III and the major crystalline phases present as determined by X-ray diffraction were $BaTi_4O_9$, $Ba_2Ti_9O_{20}$ and $Ba_3Ti_{12}Zn_7O_{34}$. The electrical characteristics of the sample are also shown in Table III. The Q value for this material was quie high as was the dielectric constant.

EXAMPLE 9

The procedure of Example 1 was essentially repeated to produce a different ceramic composition in accordance with the present invention which had a size of sample acoreding to Example 2. The cermic was formed from the composition listed in Table III and the major crystalline phases present as determined by X-ray diffraction were $BaTi_4O_9$, $Ba_2Ti_9O_{20}$ and $Ba_3Ti_{12}Zn_7O_{34}$. The electrical characteristics of the sample are also shown in Table III. The sample had a relatively high Q value at the lower test frequency and an excellent value for $T_f$ as well as a high dielectric constant.

EXAMPLE 10

The procedure of Example 1 was essentially repeated to produce a different ceramic composition in accordance with the present invention. The ceramic had the composition listed in Table III and the major crystalline phases present as determined by X-ray diffraction were $BaTi_4O_9$, $Ba_2Ti_9O_{20}$ and $Ba_3Ti_{12}Zn_7O_{34}$. The electrical characteristics of the sample are also shown in Table III.

TABLE III

| Example No. | Value of n | Oxide[1] (mol %) | ZnO (mol %) | $Nb_2O_5$ (mol %) | $Q^{[2]}$ | $Q^{[3]}$ | $T_f^{[4]}$ | $E^{[5]}$ |
|---|---|---|---|---|---|---|---|---|
| 1 | 0 | 63.5 | 33.5 | 3.00 | 10,200 | | 0.5 | 36.6 |
| 2 | 0 | 62 | 35 | 3.00 | 10,500 | 35,000 | −0.5 | 36.6 |
| 3 | 0 | 61.81 | 34.72 | 3.47 | 10,600 | 35,000 | −0.1 | 35.5 |
| 4 | 0 | 69.05 | 28.13 | 2.82 | 11,000 | 33,000 | 3.2 | 36.6 |
| 5 | 0.1 | 61.34 | 35.14 | 3.52 | 10,300 | | −2.2 | 36 |
| 6 | 0.1 | 65.12 | 31.21 | 3.67 | 10,600 | 35,000 | 0 | 37 |
| 7 | 0.1 | 65 | 32.00 | 3.00 | 10,100 | | −0.4 | 36.9 |
| 8 | 0.1 | 75.44 | 20.47 | 4.09 | 11,700 | 32,500 | 5.5 | 37.3 |
| 9 | 0.2 | 68.11 | 28.03 | 3.86 | 10,700 | 34,000 | −0.6 | 37.4 |
| 10 | 0.2 | 80.45 | 15.17 | 4.38 | 10,400 | | 5 | 38.7 |

Notes to Table III:
1. Oxide is of the formula $BaTi_{4+n}O_{9+2n}$
2. Determined at 4 to 4.5 GHz
3. Determined at 850–900 MHz
4. Defined by $\Delta f/f\Delta T$ where f is frequency at 25° and T is room temperature to 60° C., $\Delta T = 35°$ C.
5. Measured for samples having less than 2 percent porosity, that is, greater than 98 percent theoretical density.

It should be noted from the above that all of the compositions of the present invention have an excellent combination of electrical characteristics including the Q value at the frequencies of particular interest for dielectric resonators, the dielectric constant and the $T_f$ value. All of the compositions thus are well adapted for use in the applications as described previously, particularly for use as electrical components in equipment operating at microwave frequencies.

While there has been shown and described what are considered to be preferred embodiments of the present invention, it will be apparent to those skilled in the art to which the invention pertains that various changes and modifications may be made therein without departing from the invention as defined in the appended claims.

We claim:

1. A ceramic composition comprising at least three of the four phases $BaTi_4O_9$, $Ba_2Ti_9$, $BaZn_2Ti_4O_{11}$ and $Ba_3Nb_4Ti_4O_{21}$.

2. A ceramic composition as recited in claim 1, further comprising the phase $Ba_3Ta_4TiO_{21}$.

3. A ceramic composition as recited in claim 1, wherein said composition satisfies the formula:

$BaTi_{(4+n)}O_{(9+2n)}$, $0 \leq n \leq 0.3$.

4. A ceramic composition as recited in claim 2, wherein the ratio between the amount of $Ba_3Nb_4Ti_4O_{21}$ and the amount of $Ba_3Ta_4Ti_4O_{21}$ is about 75:25.

5. A ceramic composition as recited in claim 1, further comprising Mn in the range of from 0.01 to 0.1 wt. percent, based on the total weight of said composition.

6. A ceramic composition as recited in claim 5, wherein said Mn is present in an amount in the range of from 0.02 to 0.1 wt. percent, based on the total weight of said composition.

7. A ceramic composition as recited in claim 2, wherein the ratio of the amount of Nb to the amount of Ta+Nb is from about 0.001 to 1.0.

8. A ceramic composition as recited in claim 1, wherein said $BaTi_4O_9$ contains Zn and Nb in solid solution.

9. A ceramic composition as recited in claim 1, wherein said $Ba_2Ti_9O_{20}$ contains Zn and Nb in solid solution.

* * * * *